(12) United States Patent
Chakrabarti et al.

(10) Patent No.: US 9,537,741 B2
(45) Date of Patent: Jan. 3, 2017

(54) DATA PATH PERFORMANCE MEASUREMENT USING TEST MESSAGES IN A SOFTWARE DEFINED NETWORK

(71) Applicant: Telefonaktiebolaget L M Ericsson (publ), Stockholm (SE)

(72) Inventors: Samita Chakrabarti, Sunnyvale, CA (US); Alexander Bachmutsky, Sunnyvale, CA (US)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 144 days.

(21) Appl. No.: 14/341,760

(22) Filed: Jul. 25, 2014

(65) Prior Publication Data
US 2016/0028603 A1  Jan. 28, 2016

(51) Int. Cl.
*H04L 12/26* (2006.01)

(52) U.S. Cl.
CPC ......... *H04L 43/0852* (2013.01); *H04L 43/106* (2013.01); *H04L 43/50* (2013.01); *H04L 43/087* (2013.01)

(58) Field of Classification Search
None
See application file for complete search history.

(56) References Cited

U.S. PATENT DOCUMENTS

| | | | | |
|---|---|---|---|---|
| 6,560,648 B1 * | 5/2003 | Dunn | ................. | H04L 12/2697 709/223 |
| 8,665,746 B2 * | 3/2014 | Mack-Crane | ....... | H04L 43/0888 370/253 |
| 9,148,354 B2 * | 9/2015 | Johnsson | ............ | H04L 41/5038 |
| 2006/0285501 A1 * | 12/2006 | Damm | .................. | H04L 41/142 370/252 |
| 2008/0117829 A1 * | 5/2008 | Nakano | ............... | H04L 12/2697 370/247 |
| 2012/0124606 A1 * | 5/2012 | Tidwell | ............ | H04N 21/25833 725/17 |

(Continued)

FOREIGN PATENT DOCUMENTS

CN    103765823 A    4/2014

OTHER PUBLICATIONS

IEEE Standard for a Precision Clock Synchronization Protocol for Networked Measurement and Control Systems; IEEE Instrumentation and Measurement Society; IEEE Std 1588-2008; IEEE 3 Park Avenue, New York, NY 10016-5997; Jul. 24, 2008; 289pgs.

(Continued)

*Primary Examiner* — Donald Mills
(74) *Attorney, Agent, or Firm* — Nicholson De Vos Webster & Elliott, LLP

(57) ABSTRACT

A method in a network controller of a control plane in a software defined network (SDN) coupled to a plurality of network elements (NEs) of a data plane in the SDN is described. The method includes at least sending a first control message to an ingress NE of the plurality of NEs to initiate a first test session; sending a second control message to an egress NE of the plurality of NEs to initiate a second test session; sending the test message to the ingress NE to cause the ingress NE to transmit the outgoing message from the ingress NE; receiving the first reply message from the ingress NE; receiving the second reply message from the egress NE; and calculating an indication of a delay between the ingress NE and the egress NE.

24 Claims, 11 Drawing Sheets

(56) References Cited

U.S. PATENT DOCUMENTS

| | | | |
|---|---|---|---|
| 2013/0088977 A1* | 4/2013 | Baillargeon | H04L 12/4633 370/251 |
| 2013/0117434 A1* | 5/2013 | Chakrabarti | H04L 45/70 709/224 |
| 2014/0016474 A1 | 1/2014 | Beheshti-Zavareh et al. | |
| 2014/0092736 A1 | 4/2014 | Baillargeon | |

OTHER PUBLICATIONS

"Media Access Control (MAC) Bridges and Virtual Bridge Local Area Networks", IEEE Standards Association; IEEE Computer Society; IEEE Std 802.1Q-2011; IEEE 3 Park Avenue, New York, NY 10016-5997; Aug. 31, 2011; 1365pgs. 'http://standards.ieee.org/getieee802/download/802.1Q-2011.pdf'.

Postel, J., "User Datagram Protocol," Aug. 28, 1980; 3 pages; RFC 768.

Deering, S. et al., "Internet Protocol," Version 6 (IPv6) Specification, Network Working Group; RFC 2460; Dec. 1998; 39 pages.

Borman, D. et al., "IPv6 Jumbograms," Network Working Group; RFC 2675; Aug. 1999; 9 pages.

Fenner, B. et al. "Management Information Base for the User Datagram Protocol (UDP)," Network Working Group; RFC 4113; Jun. 2005; 19 pages.

Eggert, L., et al. "Unicast UDP Usage guidelines for Application Designers," Network Working Group; RFC 5405; Nov. 2008; 27 pages.

Postel, J., " Transmission Control Protocol," STD 7, RFC 793, Internet Standard; Sep. 1981; 91 pages.

Socolofsky, T. et al., "A TCP/IP Tutorial," Network Working Group; RFC 1180; Jan. 1991; 28 pages.

Nichols, K. et al., "Definition of the Differentiated Services Field (DS Field) in the IPv4 and IPv6 Headers," Network Working Group; RFC 2474; Dec. 1998; 20 pages.

Blake, S. et al., "An Architecture for Differentiated Services," Network Working Group; RFC 2475; Dec. 1998; 36 pages.

Heinanen, J. et al., "Assured Forwarding PHB Group," Network Working Group; RFC 2597; Jun. 1999; 11 pages.

Black, D. "Differentiated Services and Tunnels," Network Working Group; RFC 2983; Oct. 2000; 14 pages.

Nichols, K. et al. "Definition of Differentiated Services Per Domain Behaviors and Rules for their Specification," Network Working Group; RFC 3086; Apr. 2001; 24 pages.

Black, D. et al., "Per Hop Behavior Identification Codes," Network Working Group; RFC 3140; Jun. 2001; 8 pages.

Davie, B. et al., "An Expedited Forwarding PHB (Per-Hop Behavior)," Network Working Group; RFC 3246; Copyright the Internet Society (2001); Mar. 2002; 16pgs.

Charny, A. et al., "Supplemental Information for the New Definition of the EF PHB (Expedited Forwarding Per-Hop Behavior)," Network Working Group; RFC 3247; Mar. 2002; 24 pages.

Grossman, D. "New Terminology and Clarifications for Diffserv," Network Working Group; RFC 3260; Apr. 2002; 10 pages.

Babiarz, J. et al., "Configuration Guidelines for DiffServ Service Classes," Network Working Group; RFC 4594; Aug. 2006; 57 pages.

Baker, F. et al., "A Differentiated Services Code Point (DSCP) for Capacity-Admitted Traffic," Internet Engineering Task Force (IETF); RFC 5865; May 2010; 14 pages.

Baker, F. et al., "Management Information Base for the Differentiated Services Architecture," Network Working Group; RFC 3289; Copyright The Internet Society (2002). May 2002; 116pgs.

Bernet, Y. et al., "An Informal Management Model for Diffserv Routers," Network Working Group; RFC 3290; May 2002; 56 pages.

Chan, K. et al., "Differentiated Services Quality of Service Policy Information Base," Network Working Group; RFC 3317; Mar. 2003; 96 pages.

Hedayat, K. et al., "*A Two-Way Active Measurement Protocol (TWAMP)*," Network Working Group; RFC: 5357; Oct. 2008; 26pgs.

Morton, A. et al., "*Mixed Security Mode for the Two-Way Active Measurement Protocol (TWAMP)*," Network Working Group; RFC: 5618; Updates: 5357; Aug. 2009; 8pgs.

Morton, A. et al., "Individual Session Control Feature for the Two-Way Active Measurement Protocol (TWAMP)," IETF; RFC: 5938; Updates: 5357; Aug. 2010; 17pgs.

Morton, A. et al., "*Two-Way Active Measurement Protocol (TWAMP) Reflect Octets and Symmetrical Size Features*," IETF; RFC: 6038; Updates: 5357; Oct. 2010; 18pgs.

Shalunov, S. et al., "*A One-Way Active Measurement Protocol (OWAMP)*," Network Working Group; RFC: 4656; Sep. 2006; 56pgs.

Hanks, S. , et al., "*Generic Routing Encapsulation (GRE)*," Network Working Group RFC: 1701; Oct. 1994; 8pgs.

Hanks, S. , et al., "*Generic Routing Encapsulation over IPv4 networks*," Network Working Group; RFC: 1702; Oct. 1994; 4pgs.

Farinacci, D. et al., "*Generic Routing Encapsulation (GRE)*," Network Working Group; RFC: 2784; Mar. 2000; 9pgs.

Dommety, G. et al., "*Key and Sequence Number Extensions to GRE*," Network Working Group; RFC: 2890; Sep. 2000; 7pgs.

"*OpenFlow Switch Specification*," Feb 28, 2011; 56pgs; Version 1.1.0 Implemented (Wire Protocol 0x02); downloaded from 'http://www.openflow.org/documents/openflow-spec-v1.1.0.pdf' on Sep. 26, 2011.

Gardikis, et al., "An SNMP Agent for Active In-network Measurements," IV International Congress on Ultra Modem Telecommunications and Control Systems (ICUMT), IEEE, Oct. 3, 2012, pp. 302-307.

Non-Final Office Action, U.S. Appl. No. 14/341,761, mailed Mar. 31, 2016, 19 pages.

\* cited by examiner

650

Send additional control messages to a set of one or more intermediate NEs of the plurality of NEs to initiate test sessions, wherein there is a network path from the ingress NE through the set of intermediate NEs to the egress NE, wherein content of the additional control messages instructs each one of the set of intermediate NEs to respond to receipt of an incoming test message from an upstream NE with transmission of a reply message to the network controller and with transmission along the network path of an outgoing test message from that intermediate NE, wherein the set of intermediate NEs is downstream of the ingress NE and upstream of the egress NE
652

Responsive to the sending of the incoming test message to the ingress NE, receive a from each of the set of intermediate NEs a reply message that includes one or more timestamps, the one or more timestamps including a received timestamp indicating when that intermediate NE received its incoming test message and a sent timestamp indicating the time that intermediate NE sent the reply message
654

Calculate an indication of a delay between a first of the plurality of NEs and a second of the plurality of NEs based on the difference between one of the one or more timestamps indicated in the reply message of the first NE and one of the one or more timestamps indicated in the reply message of the second NE, wherein the first and second NEs are NEs in a set of the plurality of NEs that have sent reply messages to the network controller
656

FIG. 6B

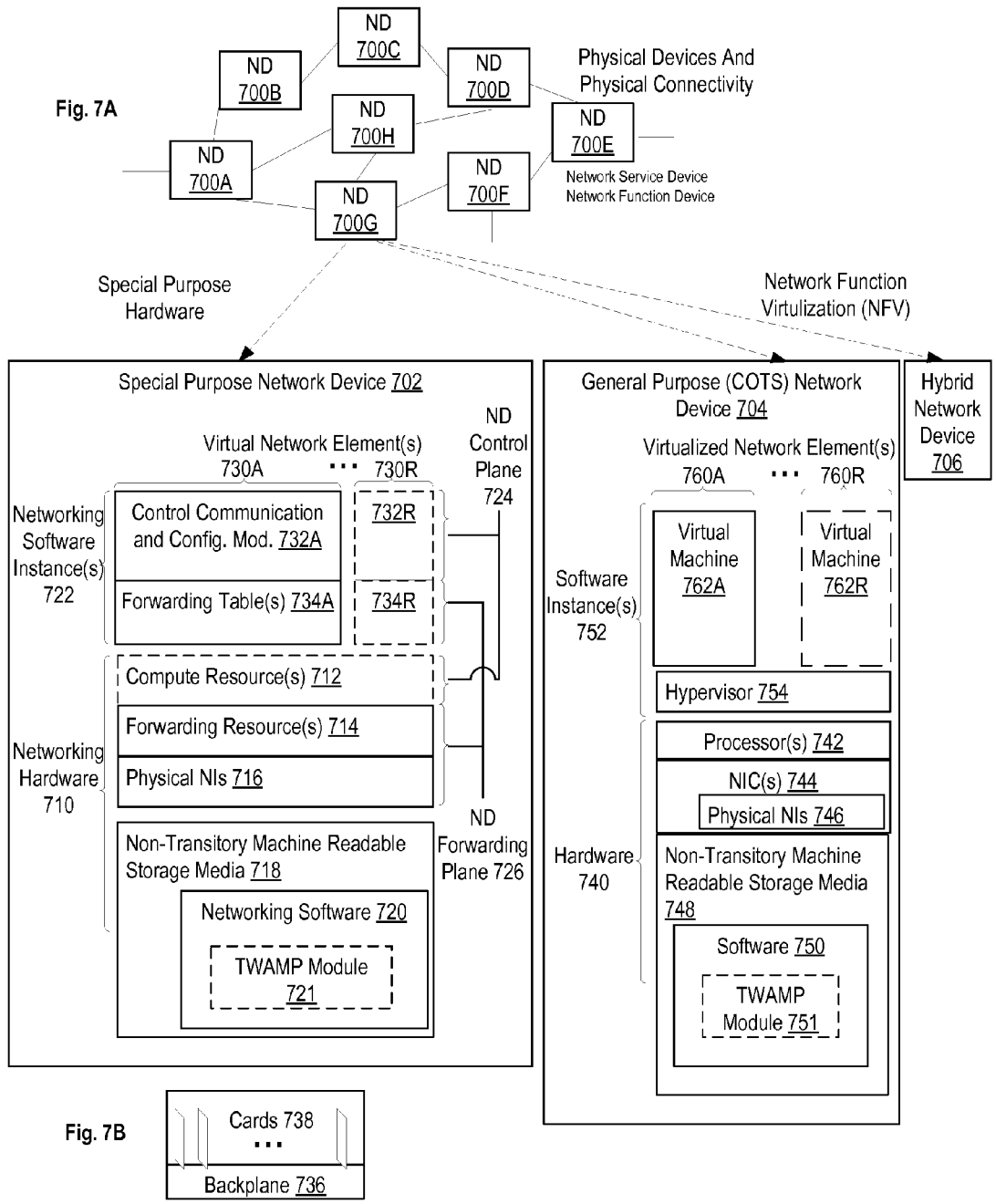

DATA PATH PERFORMANCE MEASUREMENT USING TEST MESSAGES IN A SOFTWARE DEFINED NETWORK

FIELD

Embodiments of the invention relate to the field of software-defined networking (SDN); and more specifically, to data path performance measurement using test messages in a software defined network.

BACKGROUND

One method of measuring performance in a network is by using Two-Way Active Measurement Protocol (TWAMP; IETF RFC 5357). TWAMP is a protocol that defines a method of performing round trip measurement of performance metrics such as delay and jitter. TWAMP is based on One-Way Active Measurement Protocol (OWAMP; IETF RFC 4656). TWAMP includes a control protocol and a test protocol. The control protocol defines configuration messages to be sent to the TWAMP nodes with different modes and to be sent to initialize test sessions. The test protocol defines the format of test messages to be sent to the TWAMP nodes and the reply messages from the TWAMP nodes. When a sender node sends a TWAMP test message to a recipient node, the recipient node will send a TWAMP reply message to the sender node. The test message and the reply message may include one or more timestamps indicating the time that packets were sent or received in order to measure performance along the round trip path taken by the test and reply messages.

SUMMARY

According to some embodiments of the invention, a method in a network controller of a control plane in a software defined network (SDN) coupled to a plurality of network elements (NEs) of a data plane in the SDN is described. The method includes sending a first control message to an ingress NE of the plurality of NEs to initiate a first test session, wherein content of the first control message instructs the ingress NE to respond to an incoming test message sent from the network controller and received by the ingress NE with transmission of a first reply message to the network controller and with transmission toward a destination NE of an outgoing test message from the ingress NE, wherein the destination NE is in the SDN and is downstream from the ingress NE, and wherein the ingress NE is a first edge NE within the SDN.

The method further includes sending a second control message to an egress NE of the plurality of NEs to initiate a second test session, wherein content of the second control message instructs the egress NE to respond to an incoming test message sent from an upstream NE and received by the egress NE with transmission of a second reply message to the network controller, wherein the egress NE is a second edge NE within the SDN. The method further includes sending the test message to the ingress NE to cause the ingress NE to transmit the outgoing message from the ingress NE, wherein the outgoing test message from the ingress NE causes the receipt of the incoming test message received by the egress NE.

According to some embodiments, the destination NE is the egress NE. According to some embodiments, the first control message further causes the ingress NE to set a destination address indicator of the outgoing test message received by the ingress NE to include a destination address of the destination NE before transmission of the outgoing test message by the ingress NE to the destination NE.

The method further includes receiving the first reply message from the ingress NE, wherein the first reply message includes a first set of one or more timestamps, the first set of timestamps including a first received timestamp that indicates the time when the ingress NE received the incoming test message received by the ingress NE.

According to some embodiments, the first reply message further includes a first sent timestamp that indicates the time when the ingress NE sent the first reply message.

According to some embodiments, a sender address indicator of the outgoing test message received by the ingress NE is an address of the network controller, and wherein the first reply message is sent to the network controller based on the address of the network controller in the sender address indicator.

The method further includes receiving the second reply message from the egress NE, wherein the second reply message includes a second set of one or more timestamps, the second set of timestamps including a second received timestamp that indicates the time when the egress NE received the incoming test message received by the egress NE.

The method further includes calculating an indication of a delay between the ingress NE and the egress NE based on a difference in time between one timestamp of the first set of timestamps and one timestamp of the second set of timestamps.

According to some embodiments, the method further includes sending additional control messages to a set of one or more intermediate NEs of the plurality of NEs to initiate test sessions, wherein there is a network path from the ingress NE through the set of intermediate NEs to the egress NE, wherein content of the additional control messages instructs each one of the set of intermediate NEs to respond to receipt of an incoming test message from an upstream NE with transmission of a reply message to the network controller and with transmission along the network path of an outgoing test message from that intermediate NE, wherein the set of intermediate NEs is downstream of the ingress NE and upstream of the egress NE.

In these embodiments, the method further includes, responsive to sending the incoming test message to the ingress NE, receiving from each of the set of intermediate NEs a reply message that includes one or more timestamps, the one or more timestamps including a received timestamp indicating when that intermediate NE received its incoming test message and a sent timestamp indicating the time that intermediate NE sent the reply message.

In these embodiments, the method includes calculating an indication of a delay between a first of the plurality of NEs and a second of the plurality of NEs based on the difference between one of the one or more timestamps indicated in the reply message of the first NE and one of the one or more timestamps indicated in the reply message of the second NE, wherein the first and second NEs are NEs in a set of the plurality of NEs that have sent reply messages to the network controller.

According to some embodiments, each one of the set of intermediate NEs transmits its outgoing test message to a downstream NE that is along the network path and that is pre-selected by the network controller.

According to some embodiments, the network controller further calculates a jitter indication along the network path by comparing one or more variations in a plurality of indications of delay between the NEs along the network path.

According to some embodiments, the test and reply messages are Two-Way Active Measurement Protocol (TWAMP) Test messages and the control messages are TWAMP Control messages.

Thus, embodiments of the invention include a method for data path performance measurement using test messages in a software defined network.

BRIEF DESCRIPTION OF THE DRAWINGS

The invention may best be understood by referring to the following description and accompanying drawings that are used to illustrate embodiments of the invention. In the drawings:

FIG. 6B is a flow diagram illustrating a method 650 for data path performance measurement using test messages in a software defined network according to an embodiment of the invention.

FIG. 7A illustrates connectivity between network devices (NDs) within an exemplary network, as well as three exemplary implementations of the NDs, according to some embodiments of the invention.

FIG. 7B illustrates an exemplary way to implement the special-purpose network device 702 according to some embodiments of the invention.

DESCRIPTION OF EMBODIMENTS

Figure 1:
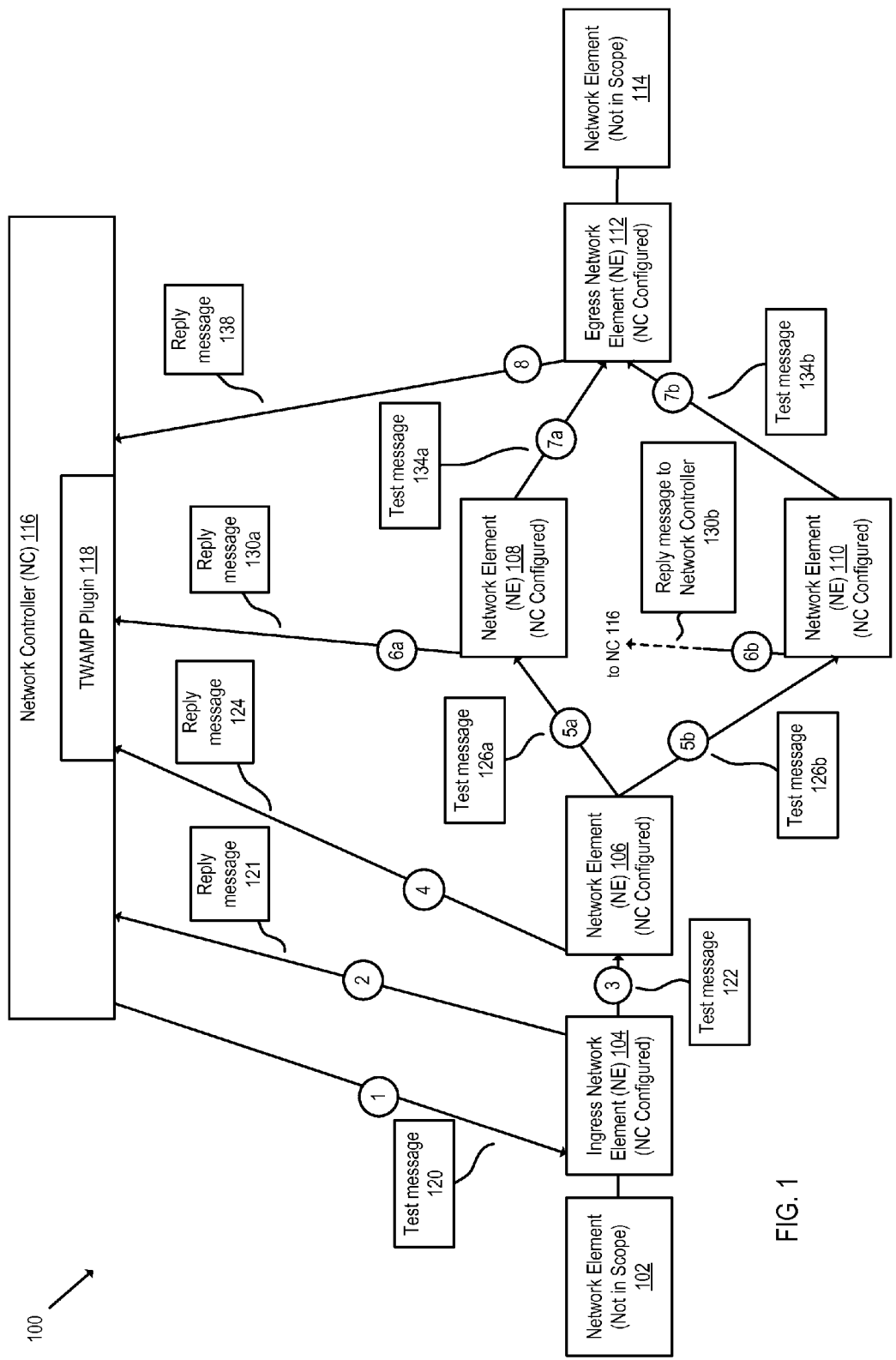
FIG. 1 illustrates a method in a system 100 for data path performance measurement using test messages in a software defined network according to an embodiment of the invention.

The following description describes methods and apparatuses for data path performance measurement using test messages in a software defined network. In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments of the invention.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

An electronic device stores and transmits (internally and/or with other electronic devices over a network) code (which is composed of software instructions and which is sometimes referred to as computer program code) and/or data using machine-readable media, such as non-transitory machine-readable media (e.g., machine-readable storage media such as magnetic disks, optical disks, read only memory, flash memory devices, phase change memory) and transitory machine-readable transmission media (e.g., electrical, optical, acoustical or other form of propagated signals—such as carrier waves, infrared signals). Thus, an electronic device (e.g., a computer) includes hardware and software, such as a set of one or more processors coupled to one or more non-transitory machine-readable storage media (to store code for execution on the set of processors and data) and a set or one or more physical network interface(s) to establish network connections (to transmit code and/or data using propagating signals). One or more parts of an embodiment of the invention may be implemented using different combinations of software, firmware, and/or hardware.

A network device (ND) is an electronic device that communicatively interconnects other electronic devices on the network (e.g., other network devices, end-user devices). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video).

A network interface (NI) may be physical or virtual; and in the context of IP, an interface address is an IP address assigned to a NI, be it a physical NI or virtual NI. A virtual NI may be associated with a physical NI, with another virtual interface, or stand on its own (e.g., a loopback interface, a point-to-point protocol interface). A NI (physical or virtual) may be numbered (a NI with an IP address) or unnumbered (a NI without an IP address). A loopback interface (and its loopback address) is a specific type of virtual NI (and IP address) of a NE/VNE (physical or virtual) often used for management purposes; where such an IP address is referred to as the nodal loopback address. The IP address(es) assigned to the NI(s) of a ND are referred to as IP addresses of that ND; at a more granular level, the IP address(es) assigned to NI(s) assigned to a NE/VNE implemented on a ND can be referred to as IP addresses of that NE/VNE.

FIG. 1 illustrates a method in a system 100 for data path performance measurement using test messages in a software defined network according to an embodiment of the invention. In FIG. 1, the circled numbers are used to denote transactions performed by the elements in the system. The order/sequence of the transactions in FIG. 1 is shown for illustrative purposes, and is not intended to be limitations of the present invention.

System 100 includes a software-defined network (SDN) represented by network controller 116 and network elements (NEs) 104-112. In an SDN, the functionalities associated with the control plane and the data plane of a traditional network device are decoupled. In the illustrated embodiment, the control plane resides in the network controller 116 and the data plane resides in the NEs 104-112. The control plane device in the SDN communicates with the data plane devices using an SDN communications protocol (e.g., OpenFlow; defined by the Open Networking Foundation). The structure of the SDN is described in further details in reference to FIGS. 7A, 7B, 7C, and 8.

An SDN network provides a network administrator with a centrally managed control plane (e.g., the network controller 116) and may simplify management and reduce costs. The link between the control plane element and the data plane elements may have increased latency as it is a network link. This additional latency may cause issues if an administrator wishes to measure the network performance between data plane elements.

Although the depicted embodiment in system 100 includes five NEs 104-112, it shall be appreciated that system 100 may include more or less NEs and/or network controllers that may communicate with each other.

System 100 includes network element 102 and network element 114. In some embodiments, these represent network elements that are not controlled by the network controller 116 and may be network elements that are part of other networks. Thus, the NE's 104 and 112 reside on the edge of the depicted SDN as they are the edge NEs that are coupled with the network elements 102 and 114, respectively. In some embodiments, network elements 102 and 114 are within the SDN, but are outside of the scope of the set of network elements from which a performance measurement is sought.

In some embodiments, the network controller 116 includes a Two-Way Active Measurement Protocol (TWAMP; IETF RFC 5357, 5618, 5938, 6038, incorporated here by reference) plugin 118 to measure the performance measurements between data plane NEs 104-112.

TWAMP defines a measurement protocol based on One-way Active Measurement Protocol (OWAMP; IETF RFC 4656, incorporated here by reference) that provides round trip measurement of network performance along with authentication and security features between the network devices between which the network performance measurement is desired. TWAMP defines a logical model including a Session-Sender, Session-Reflector, Server, and Control-Client. TWAMP also defines a TWAMP-Control type messages and TWAMP-Test type messages. The Control-Client sends a TWAMP-Control message to the Server to initiate a TWAMP session. The Server responds to the Control-Client with a TWAMP-Control message indicating the modes that it supports (e.g., unauthenticated, authenticated, and encrypted modes). The Control-Client sends a request with a TWAMP-Control message to the Server that includes a selected mode from the modes supported by the Server and any supporting information that the mode requires (e.g., security keys for encrypted modes, etc.). The Server responds with a TWAMP-Control message to the Control-Client acknowledging the request.

The Control-Client may then send one or more TWAMP-Control messages to the Server to request one or more test sessions. The Server acknowledges these sessions with the Control-Client, and the Control-Client sends a TWAMP-Control message to the Server to start each session. The Control-Client is coupled with the Session-Sender, which, for each test session, sends one or more TWAMP-Test messages to the Session-Reflector, which is coupled with the Server. The Session-Reflector responds to the one or more TWAMP-Test messages with TWAMP-Test reply messages. The Session-Reflector only responds to those TWAMP-Test messages that correspond to and/or are identified in the test sessions established by the Control-Client. Each TWAMP-Test message sent by the Session-Sender includes a timestamp indicating when the message was sent, and each TWAMP-Test reply message sent by the Session-Reflector includes timestamps indicating when the TWAMP-Test message from the Session-Sender was received and when the TWAMP-Test reply message is sent to the Session-Sender.

The logical components of the TWAMP protocols (i.e., Control-Client, Server, Session-Sender, and Session Reflector) may be implemented in hardware in different combinations. For example, the Control-Client and Session-Sender may be on one network device, while the Server and Session-Reflector may be on a different network device.

Further details of the TWAMP protocol are defined in Internet Engineering Task Force (IETF) Request for Comments (RFCs) 5357, 5618, 5938, 6038, and 4656, which are hereby incorporated by reference. Exemplary configurations for a TWAMP Session-Sender, Session-Reflector, Server, and Control-Client are illustrated in FIGS. 5C and 5D. Note that as described above, the TWAMP components may be organized in various combinations, as shown in FIGS. 5C and 5D.

In some embodiments, the TWAMP plugin 118 in SDN Controller 116 includes functionality similar to that of a TWAMP Control-Client and Session-Sender. In some embodiments, each of NEs 104-112 includes functionality similar to that of a TWAMP Server, TWAMP Session-Reflector, and TWAMP Session-Sender. In these embodiments, the NEs, which include functionality similar to a Session-Sender but not a Control-Client, may be referred to as light senders. These light senders do not configure other TWAMP-enabled NEs, but instead only send TWAMP-Test messages to other NEs. In some embodiments, the NEs include the functionality of a TWAMP Session-Reflector and a TWAMP Session-Sender. In these embodiments, the NEs may be referred to as a light sender and a light reflector.

Before sending test message 120 as part of transaction 1, the network controller 116 configures NEs 104-112 using one or more exchanged control messages (not shown). In some embodiments, these control messages are TWAMP-Control messages. An exemplary message format for such TWAMP-Control messages, which implement a new TWAMP mode for SDN controlled performance measurements, is described with reference to FIG. 5A.

The network controller 116 sends control message(s) to each NE 104-112 to initiate a test session with the NEs for performance measurement. After a test session is initialized on an NE, the NE is caused to respond to test messages that correspond to the initialized test session. In some embodiments, the content of the control messages includes instructions that instruct the NEs to respond to these test messages. These test messages are used to measure performance in the network between the NEs. In some embodiments, the test message is a TWAMP-Test message. In some embodiments, the NEs respond to a test message with a reply message, which may also be in a TWAMP-Test message format. An exemplary message format for such TWAMP-Test messages is described with reference to FIG. 5B.

In some embodiments, the control message also configures each NE to cause the NE to forward test messages to a particular destination address or port, so that the test message takes a particular path within the SDN.

Once each NE 104-112 is configured with a test session by the network controller 116 using one or more control messages, the network controller sends a (incoming) test message 120 to the ingress NE 104 at as part of transaction 1. The ingress NE 104 responds to the test message 120 with reply message 121, and network controller 116 receives reply message 121 as part of transaction 2. Reply message 121 may include a received timestamp that indicates a time when ingress NE 104 received test message 120. Reply message 121 may also include a sent timestamp that indicates the time when the ingress NE 104 sends out reply message 121. In some embodiments, the test message 120 includes a source address identifying the network controller 116. In such embodiments, the ingress NE 104 uses this source address to determine which address to send the reply message 121 to.

As part of transaction 3, ingress NE 104 forwards or transmits an (outgoing) test message 122 to NE 106, which is the next downstream NE in the path. This test message 122 may include the same data as test message 120, or may be newly created by ingress NE 104. In some embodiments, the network controller 116, using one or more control messages, configures this forwarding behavior in ingress NE 104 for the current test session. In some embodiments, the network controller 116, using one or more control messages, configures this forwarding behavior for test messages as a default behavior for ingress NE 104 and the other NEs (e.g., NEs 106-112) in the network. In some embodiments, the network controller 116, using one or more control messages, configures ingress NE 104 to modify the destination address of received test messages (e.g., test message 120) to include the address of the next downstream NE in the path (e.g., NE 106) and send the modified test message (e.g., test message 122) to this new destination. In some embodiments, the ingress NE 104 is acting as a light sender by sending test message 122 to NE 106 with the same sender address as test message 120 and without negotiating a test session or other configuration with NE 106 using one or more control messages. Instead, in some embodiments, the test session may already be negotiated by the network controller.

In some embodiments, network controller 116 configures ingress NE 104 to send reply message 121 at a time that is as close as possible to the time that test message 122 is sent. In some embodiments, the network controller 116 configures ingress NE 104 to send reply message 121 after sending test message 122, and include in reply message 121 a timestamp indicating the time when test message 122 was sent out.

At transaction 4, NE 106 sends a reply message 124 in response to receiving (incoming) test message 122. As part of transaction 4, network controller 116 receives reply message 124. In some embodiments, NE 106 sends the reply message 124 to the address identified by the sender address in test message 122. In such embodiments, the sender address is the address of the network controller 116. In one embodiment, reply message 124 includes one or more timestamps. These timestamps may include a timestamp indicating when test message 122 was received by NE 106, a timestamp indicating when reply message 124 was sent by NE 106, and/or a timestamp indicating when test message 126a and/or 126b was sent by NE 106.

NE 106 is coupled with both NE 108 and NE 110, and thus, may forward or transmit a (outgoing) test message to either NE 108 as (outgoing) test message 126a and/or to NE 110 as (outgoing) test message 126b. The test messages 126a and 126b may include the same data as test message 122 or may be newly created by NE 106. In some embodiments, the network controller 116 configures NE 106 to forward to either NE 108 and/or NE 110 by causing NE 106 to modify the destination address of received test message 122 to include the address of NE 108 or NE 110, respectively. This modification causes test message 122 to be forwarded as test message 126a (with a destination address of NE 108) or test message 126b (with a destination address of NE 110). In this way, the network controller 116 is able to measure performance for particular paths in the network. In some embodiments, the network controller 116 configures NE 106 to forward test message 122 to both NE 108 and NE 110. In this case, NE 106 duplicates test message 122 and forwards test message 122 as test message 126a and test message 126b to NE 108 and NE 110, respectively.

As part of transaction 5a, NE 106 sends test message 126a to NE 108. As part of transaction 6a, in response to receiving test message 126a, NE 108 sends reply message 130a to network controller 116. Reply message 130a includes one or more timestamps (e.g., a timestamp indicating when NE 108 received test message 126a, when NE 108 sent reply message 130a, and/or when NE 108 sent test message 134a). Similar to transactions 3 and 5a, if NE 108 received test message 126a, NE 108 sends test message 134a to the destination egress NE 112 at transaction 7a. For example, test message 134*a* is modified from test message 126*a* (similar to how test message 126*a* is modified from test message 122) to include the new destination address.

At transaction 5*b*, NE 106 sends test message 126*b* to NE 110. At transaction 6*b*, in response to receiving test message 126*b*, NE 110 sends reply message 130*b* to network controller 116. Reply message 130*b* includes timestamps (e.g., a timestamp indicating when NE 110 received test message 126*b*, and/or when NE 110 sent reply message 130*b*, and/or when NE 110 sent test message 134*b*). Similar to transactions 3 and 5*b*, if NE 110 received test message 126*b*, NE 110 sends test message 134*b* to the destination egress NE 112 at transaction 7*b*. For example, test message 134*b* is modified from test message 126*b* (similar to how test message 126*b* is modified from test message 122) to include the new destination address.

At transaction 7*a* and/or transaction 7*b*, NE 108 and/or NE 110 sends test message 134*a* and/or test message 134*b* to egress NE 112. In some embodiments, network controller 116 configures NE 106 to send only test message 126*a* to NE 108 or test message 126*b* to NE 110. In such embodiments, at transaction 8, network controller 116 receives reply message 138 from NE 112 that includes a timestamp for when NE 112 received test message 134*a* or test message 134*b*, depending on which NE (NE 108/NE 110) the network controller 116 had configured NE 106 to forward a test message to, and a timestamp for when NE 112 sent reply message 138.

In some embodiments, network controller 116 configures NE 106 to send both test message 126*a* and test message 126*b* to NE 108 and NE 110, respectively. In such embodiments, at transaction 8, network controller 116 receives from NE 112 a reply message 138 that includes timestamps for when NE 112 received (incoming) test message 134*a*, when NE 112 received (incoming) test message 134*b*, and when NE 112 sent reply message 138. In some embodiments, the network controller 116 receives a separate reply message for each (incoming) test message that NE 112 receives. For example, if NE 112 receives both (incoming) test message 134*a* and (incoming) test message 134*b*, network controller 116 may receive from NE 112 a reply message for each test message that NE 112 received. Each reply message includes timestamps similar to those in the reply messages described above corresponding to each of the test messages received.

In some cases, the SDN includes more than two paths between two NEs. The forwarding and receipt of test messages and the sending of reply messages in such a case would be similar to the two path case described above, and would account for the additional paths in a similar fashion to that described above for NE 108 and NE 110.

Since NE 112 is an egress NE, network controller 116 also configures egress NE 112 so that it does not forward the test messages it receives (e.g., test message 134*a*) to the next network device or NE downstream of egress NE 112. In some embodiments, this is because the downstream network device or NE from egress 112 is no longer a network device or NE controlled by network controller 116 or that has network controller 116 as the control plane. In some embodiments, this is because the scope of the measurement is limited to NE 112. This limit may be configured in the network controller 116, which configures the NEs in the SDN accordingly so that those NEs that are along the edge of the scope of NEs to be measured do not forward any test messages.

After the test messages (e.g., test message 122) have propagated through the SDN, network controller 116 receives multiple reply messages (e.g., reply message 124). These reply messages include timestamps indicating when each test message was received by the respective NE and timestamps indicating when each reply message was sent by the respective NE. Network controller 116 can use this timestamp information to determine network performance measurements for the SDN. In some embodiments, network controller 116 uses the timestamps in the reply messages that indicate when each NE received a test message to determine the delay (i.e., latency) between two NEs. For example, the delay between NE 106 and NE 104 may be calculated by determining the difference between the timestamp in reply message 121 that indicates when NE 104 received test message 120, and the timestamp in reply message 124 that indicates when NE 106 received test message 122. In some embodiments, network controller 116 determines the delay by calculating the difference between the timestamp indicating when the reply message for one NE was sent and the timestamp indicating when an upstream NE received the test message in the same test session. For example, the network controller 116 determines the delay between NEs 104 and 106 by determining the difference between the timestamp indicating when reply message 124 was sent (this timestamp is provided in reply message 124) and the timestamp indicating when test message 120 was received (this timestamp is provided in reply message 121).

Some sections of the network may include more than one path. For example, two paths exist between NE 106 and NE 112. The SDN may calculate the individual delays over each path using the method described above to determine which path has less delay. A path that has a higher delay may indicate slower network links, congestion on that path, issues with the physical connection between the paths, or other network issues. The network controller 116, after determining the NE to NE (i.e., hop to hop) delay in the SDN, may respond by rerouting certain network traffic through those paths with less delay or route higher priority traffic through paths with less delay. In some circumstances the network controller may send a test message to an NE but not receive a reply message from that NE or from another NE downstream of the first NE although the network controller 116 was expecting a reply message. This may indicate a problem more serious than a longer delay (e.g., defective NE), and the SDN may respond accordingly (e.g., mark that path as non-functioning and prevent NEs from sending data through that path).

Additional methods by which the network controller 116 may use the timestamp information received from the NEs are described with reference to FIG. 2.

Although the system 100 in FIG. 1 is described to use TWAMP, the invention is not limited to using the TWAMP protocol and can use any other existing protocol that supports the features described above or may use a newly designed protocol that provides the functionality described above.

In some embodiments, the NEs in the network are time-synchronized in order to provide accurate timestamps. In some embodiments the time on the NEs is synchronized via the Precision Time Protocol (IEEE 1588).

Figure 2:
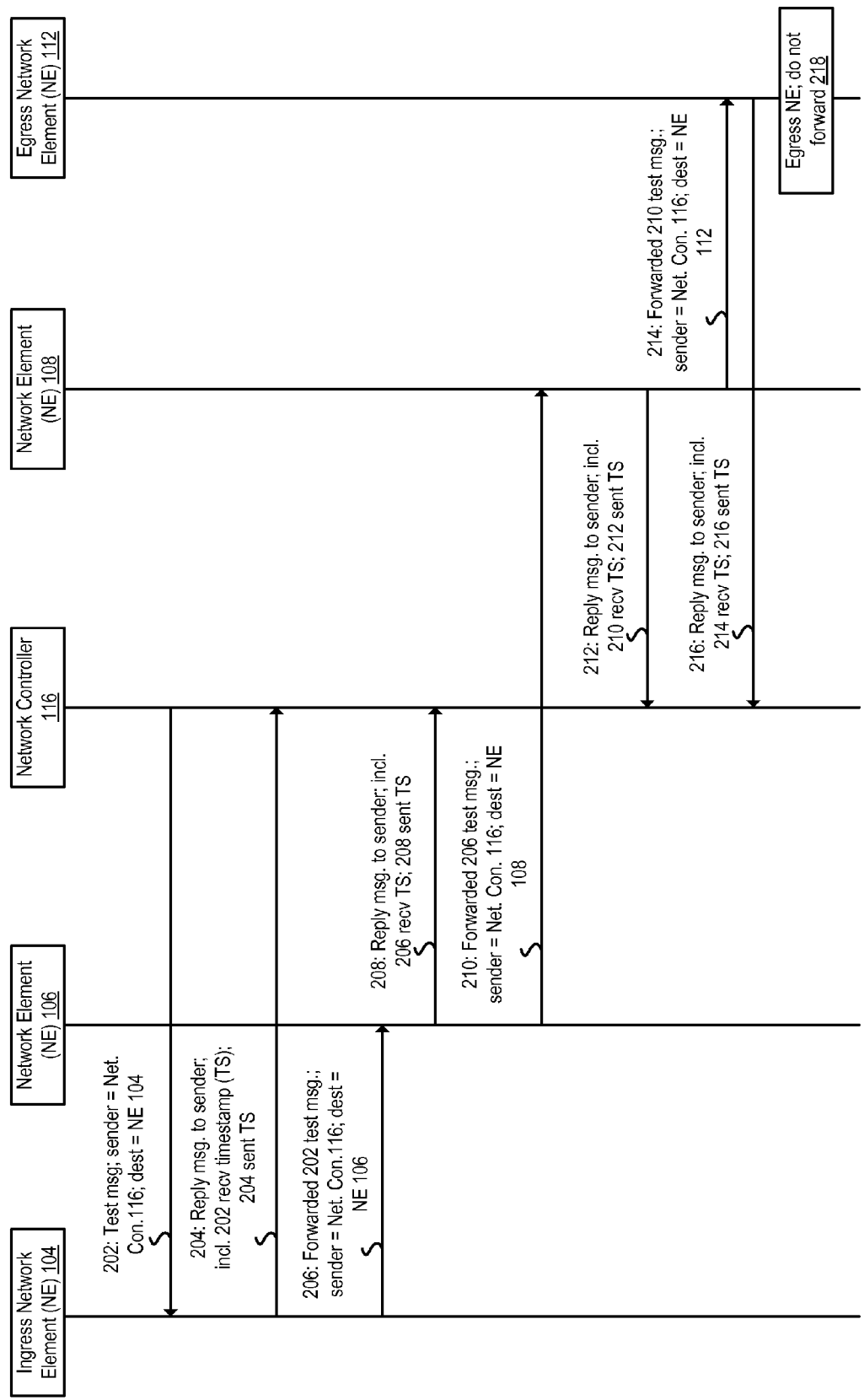
FIG. 2 is a network transaction diagram illustrating the flow of messages in a system 100 according to an embodiment of the invention.

FIG. 2 is a network transaction diagram illustrating the flow of messages according to an embodiment of the invention. The diagram in FIG. 2 reflects the elements described in system 100 in FIG. 1. However, only four NEs (NEs 104, 106, 108, and 112) along one network path are shown in order to avoid obscuring the invention.

As described with reference to FIG. 1, network controller 116 initiates test sessions with the NEs to cause the NEs to respond to test messages with reply message including various timestamps, and to forward these test messages to downstream NEs. After configuring the NEs as described with reference to FIG. 1, network controller 116 sends a test message to NE 104 (the ingress NE) at transaction 202. This test message includes a sender address indicating the address of the network controller 116, and a destination address indicating the address of NE 104. After NE 104 receives the test message sent at transaction 202, at transaction 204 NE 104 sends a reply message to the sender, which is network controller 116, so that network controller 116 receives the reply message. This reply message received by the network controller 116 at transaction 204 includes a received timestamp (TS) indicating when the test message at transaction 202 was received and a sent TS indicating when the reply message at transaction 204 was sent.

NE 104 modifies the destination address of the test message received in transaction 202 to the address of downstream NE 106 according to the methods described in reference to FIG. 1. This modified test message is sent to NE 106 in transaction 206. Note that this modified test message includes the same sender address of network controller 116 as the test message identified in transaction 202.

At transaction 208, NE 106 has received the test message in transaction 206 and sends a reply message to the sender indicated in the test message received at transaction 206. This sender is the network controller 116. The reply message sent by NE 106 at transaction 208 also includes a received TS indicating the time when the test message from transaction 206 was received, and a sent TS indicating when the reply message at transaction 208 was sent. At transaction 210, NE 106 modifies the test message received at transaction 206 with the destination address of downstream NE 108 and sends this modified test message to NE 108. As noted in the description with reference to FIG. 1, the network controller 116 may configure the NEs to change the destination addresses in the test messages to particular NEs for each test session or set a default behavior for which destination address to set for a forwarded test message.

At transaction 212, NE 108 has received the test message from transaction 210 and sends a reply message to the sender indicated in that test message (network controller 116). The reply message includes a received TS indicating when the test message from transaction 210 was received, and a sent TS indicating when the reply message at transaction 212 was sent. At transaction 214, NE 108 forwards the received test message to NE 112 after modifying the destination address using methods similar to those described above. At transaction 216, NE 112 replies to the received test message with a reply message to the sender address specified in the test message. The reply message includes timestamps similar to those TSs described above (e.g., received TS and sent TS).

At transaction 218, NE 112 does not forward the test message received at transaction 214 to a downstream NE because NE 112 is an egress NE. This behavior may have been configured by network controller 116 specifically for NE 112, or network controller 116 may have instead configured all NEs to not forward test messages if the NEs automatically determine that they (the NEs) are the egress NE(s) in the network.

As described in reference to FIG. 1, once the network controller 116 receives all the TSs in the reply messages from the NEs in the network, the network controller 116 can measure various performance indicators in the network.

In addition to those calculations described in reference to FIG. 1, in some embodiments, the network controller 116 may use the timestamp information in the reply messages to determine the network jitter (i.e., latency variation) along various paths in the network. In some embodiments, the network controller 116 measures jitter by comparing the delays between NEs along a path in the network. High variations in the delays between different NEs along a path indicates a high jitter along that path. The high jitter may indicate congestion or other issues along certain paths in the network. Furthermore, although a network path may have an overall low delay, it might have a high jitter. This is undesirable for certain traffic that benefits from a steady stream of data with data packets that are sent and received at relatively equal time intervals (e.g., voice over IP). If the network controller 116 determines that jitter along one path with low delay is high, the network controller 116 may reroute traffic that benefits from low jitter to another network path that has lower jitter even if that path has a higher delay.

In some embodiments, the network controller 116 determines whether the delay between two NEs is due to the link between the NEs or due to the NEs themselves. When the NEs send reply messages, these messages include a timestamp indicating when the reply message was sent. The network controller 116 may have configured the NEs to send the reply message as close in time as possible (e.g., simultaneously) with the forwarded test message to the next NE. Alternatively, in some embodiments, the reply messages are sent after the test message is forwarded to the next NE, and the reply message includes a timestamp indicating when the forwarded test message was sent to the next NE. As the network controller 116 has information on when a test message is received at an NE and when it is sent from that NE, along with when the test message is sent to a downstream NE, the network controller 116 may then calculate the delay at each NE, and the delay at each link between two NEs. Using the information, the network controller 116 can determine whether the delay in a path is due to the processing time at an NE or due to the link. The network controller 116 may then take appropriate action based on this information. For example, if the network controller 116 determines that an NE is slow, the network controller 116 may redirect traffic to reduce load on a slow NE or reconfigure the settings on the NE (e.g., reduce the size of the forwarding table on the NE, remove complicated forwarding or processing rules from the configuration for that NE) to increase its packet processing speed. If the network controller 116 determines that a link is slow and congested, the network controller may instruct NEs that utilize that link to redirect traffic to alternative links.

In some embodiments, the network controller 116 can calculate the total delay along an entire path from an ingress to and egress NE by summing the delays along that path from each NE to each NE.

In some embodiments, the network controller 116 uses the sent TS from the reply messages that indicate when the NE sent the reply message to determine the delay on the link between each NE and the network controller 116. The network controller 116 may calculate the difference between the sent TS from a reply message for an NE and the time when the network controller 116 received the reply message to determine this delay. The network controller 116 may be configured to take an action in response to a delay exceeding a certain threshold. For example, the network controller 116 may notify an administrator as a possible action, or may deactivate the NE that has a high delay between that NE and the network controller 116.

The types of measurements, calculations, and actions taken as a result of these measurements and calculations are not limited to those described here with reference to FIG. 1 and FIG. 2. The network controller 116, in some embodiments, can perform additional measurements based on the timestamp information received and react to those measurements in additional ways (e.g., keep a historical record of times of high delay, notify an administrator when a measurement meets a certain criteria).

Figure 3:
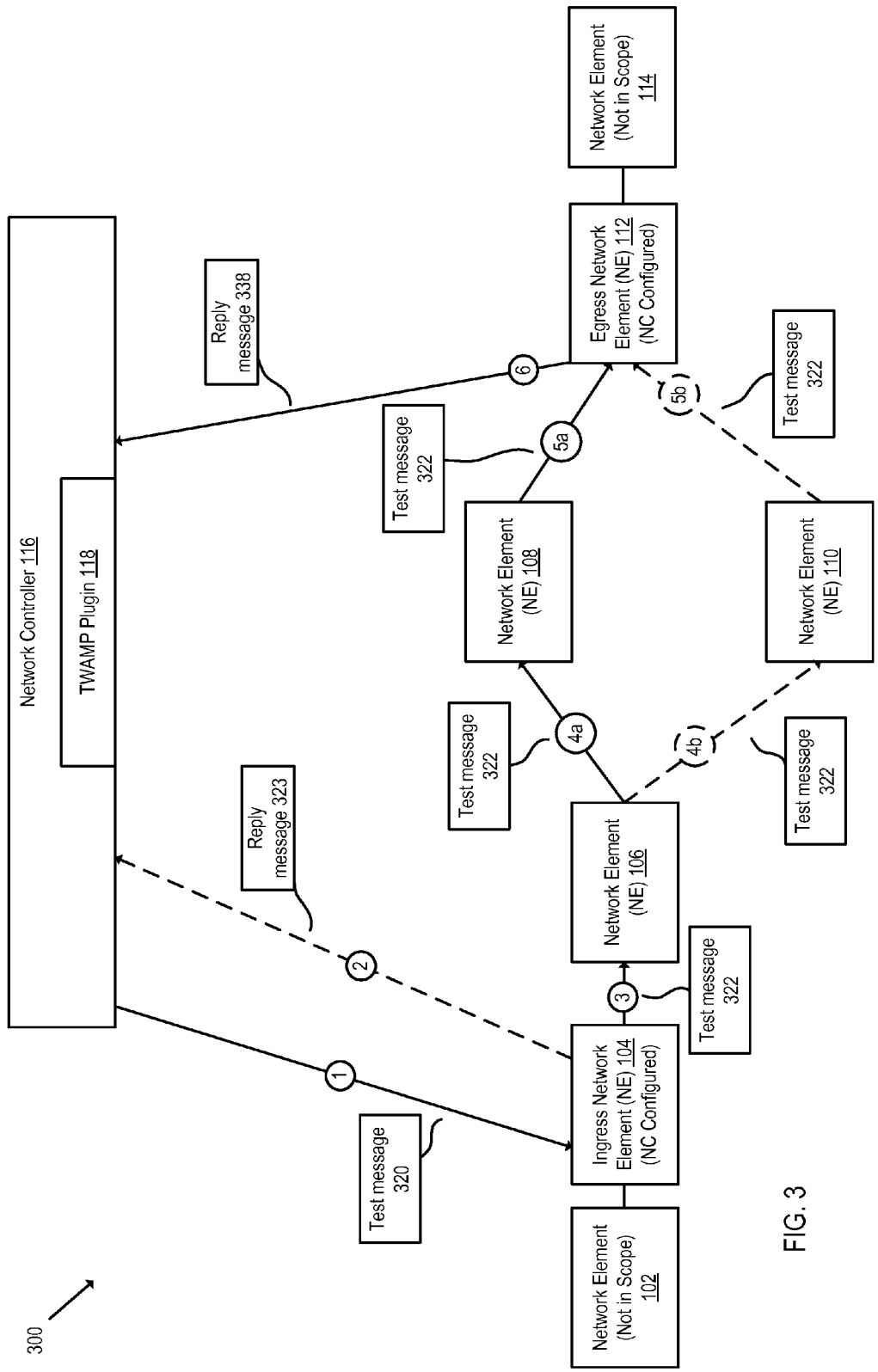
FIG. 3 illustrates an alternative method in a system 300 for data path performance measurement using test messages in a software defined network according to an embodiment of the invention.

FIG. 3 illustrates an alternative method in a system 300 for data path performance measurement using test messages in a software defined network according to an embodiment of the invention. In FIG. 3, the circled numbers are used to denote transactions performed by the elements in the system. The order/sequence of the transactions in FIG. 3 is shown for illustrative purposes, and is not intended to be limitations of the present invention. While the method in FIG. 1 had the network controller 116 send control messages to each NE in the SDN, in the method depicted in FIG. 3, the network controller 116 only sends control messages to configure the ingress NE 104 and the egress NE 112. In some embodiments, these control messages are TWAMP-Control messages. In some embodiments, the mode specified in the TWAMP-Control message for this alternative method of performance measurement is different from the mode specified in the method of performance measurement described in reference to FIG. 1.

Although the network controller 116 only sends control messages for performance measurement to ingress NE 104 and egress NE 112, in some embodiments, the network controller 116 uses a supported SDN communications protocol (e.g., OpenFlow) to configure the NEs in the SDN to forward test messages that have the network controller 116 as a sender (source) address to particular selected destinations. These test messages are the same as those described above, and in some embodiments these test messages are TWAMP-Test protocol messages.

The network controller 116, using one or more control messages, configures the ingress NE 104 to respond to (incoming) test messages that are associated with a test session with a reply message, and to modify the (outgoing) test message to forward or transmit it on a path towards the egress NE 112. In some embodiments, the network controller 116 configures the ingress NE 104 to forward a received or incoming test message as an outgoing test message to the egress NE 112 by configuring the ingress NE 104 to modify the destination address of the received test message to include the address of the egress NE 112.

The network controller 116, using one or more control messages, also configures the egress NE 112 to respond to (incoming) test messages that are associated with a test session with a reply message. In some embodiments, the network controller 116 also configures the egress NE 112 to drop a received test message after it receives it for the particular test session. In some embodiments, the network controller 116 configures the egress NE 112 to drop all received or incoming test messages so that the egress NE 112 does not forward these received test messages to network elements that are not within the SDN.

After the NEs have been configured by the network controller 116, at transaction 1, the network controller 116 sends a test message 320 to ingress NE 104. At transaction 2, in some embodiments, in response to receiving test message 320, NE 104 optionally sends reply message 323 to network controller 116. Reply message 323 includes a timestamp (TS) indicating when ingress NE 104 received (incoming) test message 320. Reply message 323 may also include a timestamp indicating when reply message 323 was sent from ingress NE 104.

At transaction 3, ingress NE 104 sends the received test message 320 as (outgoing) test message 322 towards egress NE 112. In some embodiments, ingress NE does this by modifying the destination address of test message 320 to include the address of egress NE 112 and sends this modified test message 320 as test message 322. The message is sent out on a network interface of ingress NE 104 according to the forwarding rules in the forwarding table(s) of ingress NE 104 for a message with a destination address of the egress NE 112. In the depicted embodiment of FIG. 3, the message is sent to NE 106.

After NE 106 receives (incoming) test message 122, NE 106 sends test message 322 at transaction 4a to NE 108 or at transaction 4b to NE 110. The NE/path that NE 106 sends test message 322 to is determined by the forwarding rules stored at NE 106 for messages with a destination corresponding to the egress NE 112. These rules may be general rules for all messages with a destination corresponding to the egress NE 112, or may be specific for test messages measuring network performance or for messages with a sender address corresponding to the network controller 116.

If NE 106 forwards the test message 322 to NE 108, NE 108 forwards test message 322 to the destination NE 112 at transaction 5a. Otherwise, if NE 106 forwards the test message 322 to NE 110, NE 110 forwards test message 322 to the destination NE 112 at transaction 5b.

Once egress NE 112 receives the test message 322 at transaction 5a or 5b, the NE 112 sends a reply message 338 to the network controller 116 at transaction 6. This reply message includes a timestamp indicating a time when egress NE 112 received the test message 322. In some embodiments, reply message 338 also includes a timestamp indicating when reply message 338 was sent by NE 112.

In some embodiments, ingress NE 104 includes in test message 322 a timestamp indicating when ingress NE 104 received test message 320 (e.g., as part of transaction 1) and/or a timestamp indicating when ingress NE 104 sent test message 322 (e.g., as part of transaction 3). Egress NE 112 may also include this information in reply message 338 if this information is included in test message 322 received by NE 112 as part of transaction 5a and or 5b. In such an embodiment, network controller 116 may configure ingress NE 104 not to send reply message 323 as the timestamp information that would have been in reply message 323 is in reply message 338.

Once network controller 116 receives the reply message 338 from egress NE 112, the network controller 116 may calculate the delay along the network path between ingress NE 104 and egress NE 112 that is determined by the forwarding rules within the NEs along that path. This delay may be calculated by determining the difference between the timestamp (TS) indicating when test message 320 was received by ingress NE 104 and the TS indicating when reply message 338 was sent by egress NE 112. This delay may also be calculated by determining the difference between the TS indicating when test message 320 was received by ingress NE 104 and the TS indicating when test message 322 was received by egress NE 112.

Figure 4:
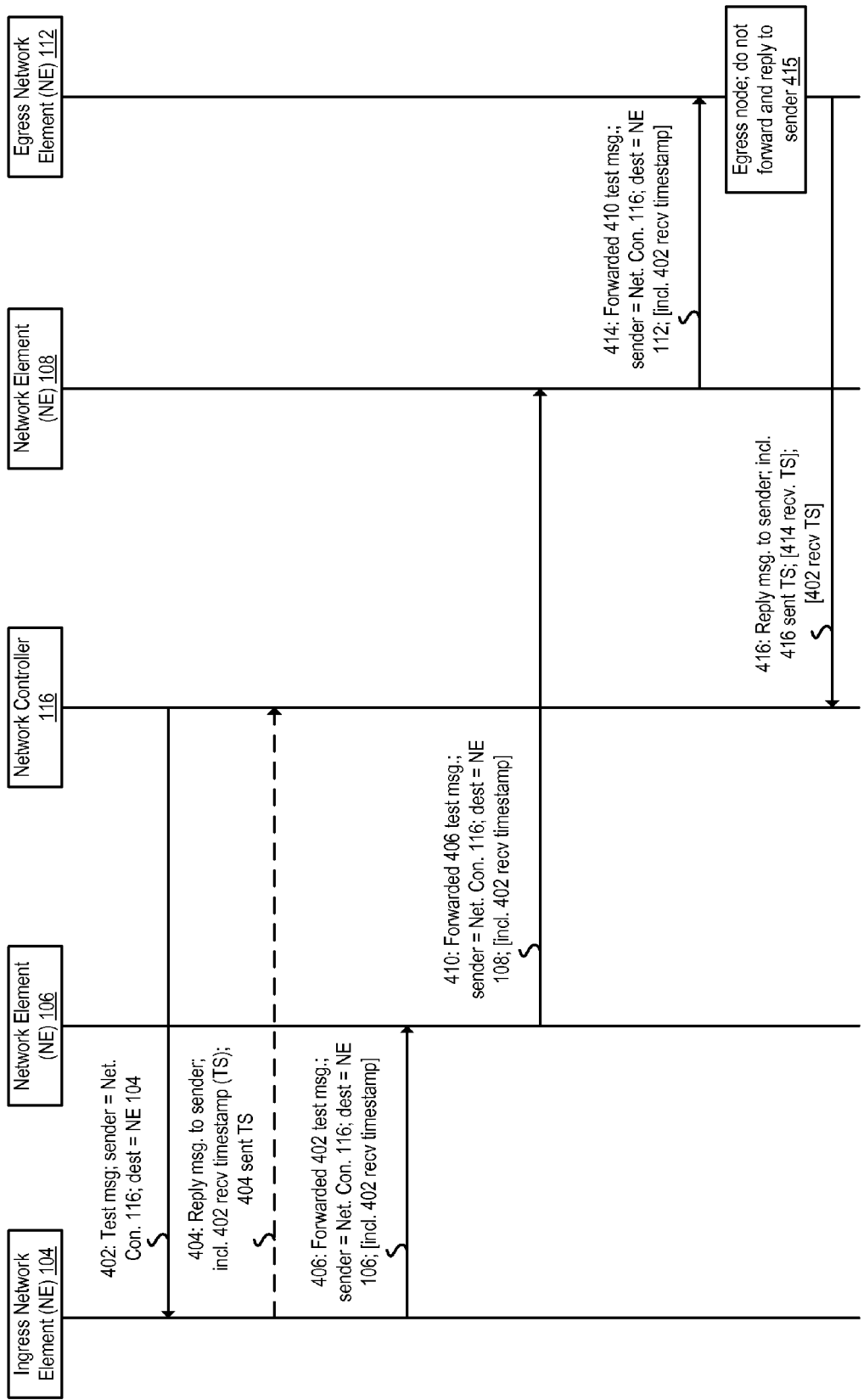
FIG. 4 is a network transaction diagram illustrating the flow of messages in a system 300 according to an embodiment of the invention.

FIG. 4 is a network transaction diagram illustrating the flow of messages according to an embodiment of the invention. The diagram in FIG. 4 reflects the elements described in system 300 in FIG. 3. However, only four NEs (NEs 104, 106, 108, and 112) along one network path are shown in order to avoid obscuring the invention.

As noted with reference to FIG. 3, network controller 116 configures ingress NE 104 and egress NE 112 using control messages. In some embodiments, network controller 116 also configures the NEs along the network path between NE 104 and NE 112 using an SDN communications protocol (e.g., OpenFlow).

After configuring the NEs, at transaction 402, network controller 116 sends a test message to NE 104. In some embodiments, this test message is TWAMP-Test message. This test message includes a sender address identifying the address of the network controller 116. This test message also includes a destination address identifying the address of NE 104.

In some embodiments, at transaction 404, NE 104 responds to the test message of transaction 402 with a reply message to network controller 116, which is the sender specified in the test message of transaction 402. The reply message includes a received timestamp indicating when the test message of transaction 402 was received, and a sent timestamp indicating when the reply message of transaction 404 was sent.

At transaction 406, ingress NE 104 modifies the test message received at transaction 402 and sends it towards egress NE 112 (e.g., by transmitting it to NE 106). In some embodiments, ingress NE 104 modifies the destination address of the test message to the address of egress NE 112. Ingress NE 112 then sends this message according to normal forwarding rules for a message with a destination address matching the address of egress NE 112, or sends this message based on the specific configuration or forwarding rules specified by network controller 116 in an SDN communications protocol message. The test message sent by ingress NE 104 also includes the sender address identifying the address of the network controller 116. In some embodiments, it also includes a timestamp indicating when NE 104 received the test message of transaction 402.

At transaction 410, NE 106 has received the test message of transaction 406 and sends it according to normal forwarding rules for a message with a destination address matching the address of NE 112, or sends this message based on the configuration or forwarding rules specified by network controller 116 in an SDN communications protocol message. In the illustrated embodiment, NE 106 sends the received test message to NE 108.

At transaction 414, NE 108 has received the test message of transaction 408 and sends it according to normal forwarding rules for a message with a destination address matching the address of NE 112, or sends this message based on the configuration or forwarding rules specified by network controller 116 in an SDN communications protocol message. In the illustrated embodiment, NE 108 sends the received test message to NE 112.

In one embodiment, network controller 116, using one or more control messages, has configured egress NE 112 to reply to test messages and not to forward the test message to another network element. In one such embodiment, at transaction 415, egress NE 112 receives the test message of transaction 414 and replies with a reply message, but does not forward the received test message to a downstream network element. At transaction 416, network controller 116 receives a reply message from egress NE 112 as a reply to the test message of transaction 414. The reply message includes a timestamp indicating when the reply message was sent by NE 112. In some embodiments, the reply message of transaction 416 also includes a timestamp indicating when the test message of transaction 414 was received. In some embodiments, the reply message of transaction 416 includes a timestamp that indicates the time when NE 104 received the test message of transaction 402 (this timestamp was received from the test message identified in transaction 414 and forwarded from NE 104).

After the network controller 116 receives the reply message of transaction 416, the network controller 116 calculates the delay along the path between NE 104 and NE 112 using mechanism described above with respect to FIG. 3.

Although the systems and methods described with reference to FIGS. 1-4 are described partly in reference to TWAMP, the invention is not limited to using the TWAMP protocol and can use any other existing protocol that supports the features described above or may use a newly designed protocol that provides the functionality described above.

Figure 5A:
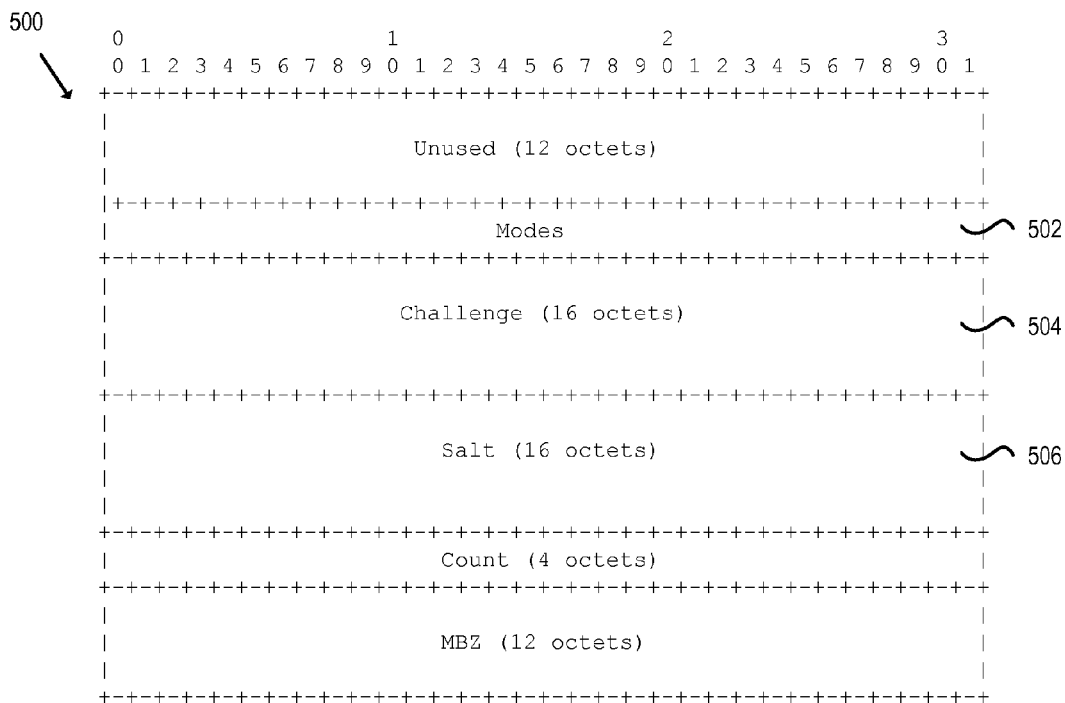
FIG. 5A illustrates an exemplary packet format 500 for a control message as described in reference to FIG. 1-4 according to some embodiments of the invention.

FIG. 5A illustrates an exemplary packet format 500 of a control message as described in reference to FIG. 1-4 according to some embodiments of the invention. In some embodiments, this control message format is based on the OWAMP-Control message format (RFC 4656, §3.1). In some embodiments, a NE supporting SDN controlled data path performance measurement responds to the network controller 116 with a control message in the packet format 500 when the network controller 116 requests to initiate a test session.

Section 502 (labeled "Modes") identifies the modes that is supported by the NE which sent the control message 500. OWAMP and TWAMP originally define three modes: 1) unauthenticated, 2) authenticated, and 3) encrypted. In some embodiments, an NE supporting SDN controlled data path performance measurement further identifies that it supports a fourth mode for SDN controlled data path performance measurement.

Section 504 (labeled "Challenge") and section 506 (labeled "Salt"), identify a challenge and a salt, respectively, which are used by the NE in some embodiments where the network controller requests an encrypted test session. The challenge is used subsequently by the network controller 116 to prove possession of a shared secret. In these embodiments, the test messages sent between the NEs (e.g., NEs 104-112) and between the NEs and the network controller 116 are encrypted.

Figure 5B:
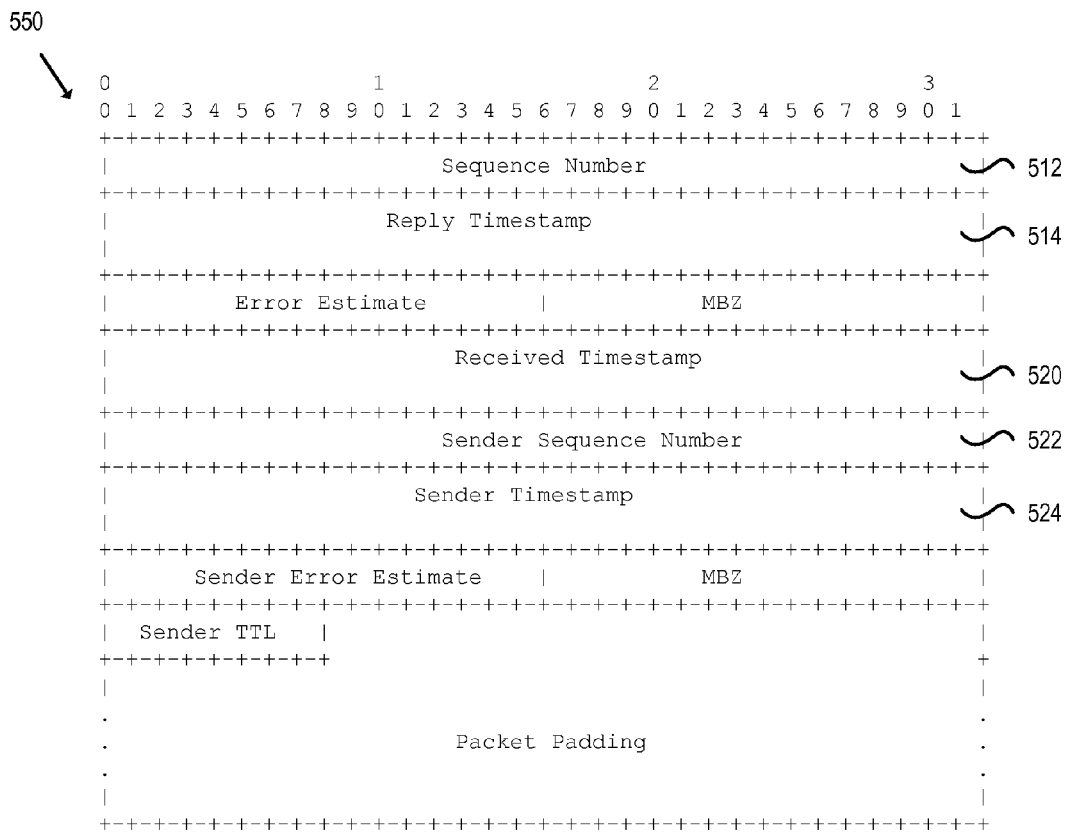
FIG. 5B illustrates an exemplary packet format 550 for a reply message as described in reference to FIG. 1-4 according to some embodiments of the invention.
Figure 5C:
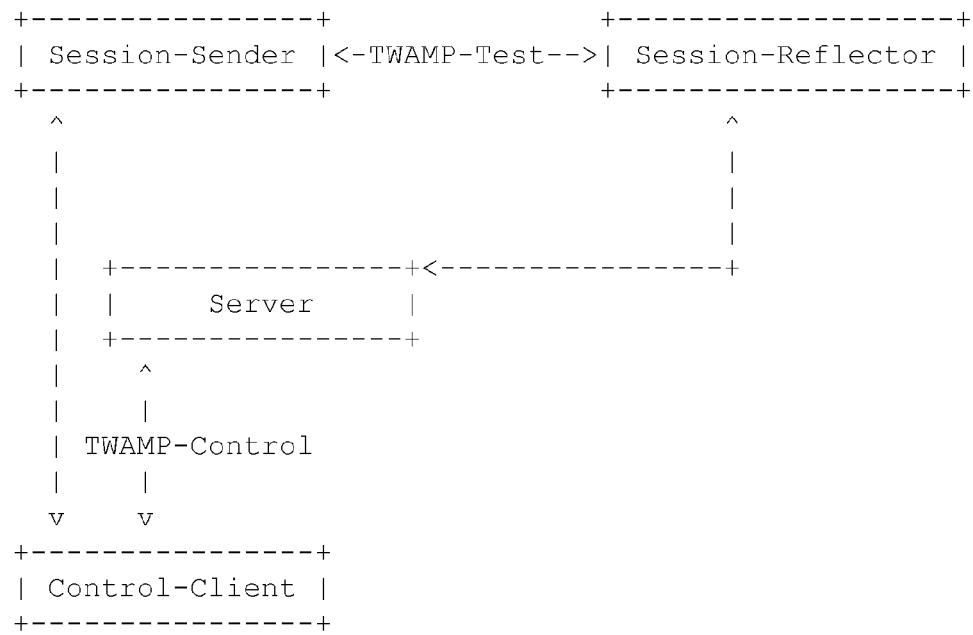
FIG. 5C illustrates an exemplary configuration for Two Way Active Measurement Protocol (TWAMP) according to an embodiment of the invention.
Figure 5D:
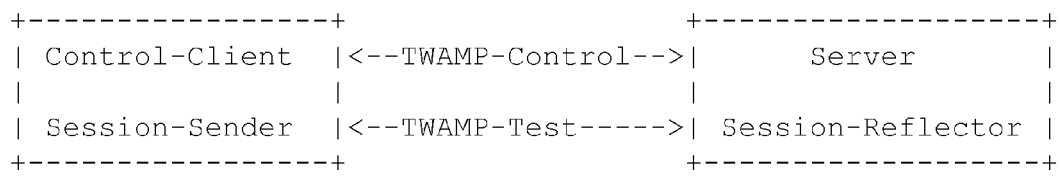
FIG. 5D illustrates another exemplary configuration for TWAMP according to an embodiment of the invention.

FIG. 5B illustrates an exemplary packet format 550 of a reply message as described in reference to FIG. 1-4 according to some embodiments of the invention. In some embodiments, this test message format is based on the TWAMP-Test message format (RFC 5357, §4.2.1). In some embodiments, a NE supporting the SDN controlled data path performance measurement replies to a test message with a reply message to the network controller 116 in packet format 550.

In some embodiments, each reply message sent by an NE increases the sequence number by one. This sequence number is included in section 512 (labeled "Sequence Number") of the reply message 550.

Section 514 (labeled "Reply Timestamp") includes the timestamp of when the reply message is sent.

Section 520 (labeled "Received Timestamp") includes the timestamp of when the NE received the test message that has caused the current reply message to be sent.

Section 522 (labeled "Sender Sequence Number") includes the sequence number copied from the test message that has caused the current reply message to be sent.

Although exemplary control and test message formats are described in FIG. 5A and FIG. 5B for the functionality described with reference to FIGS. 1-4, the invention is not limited to such control and test message formats, and may use any control or test message format, or any other message format, that can be used to implement the functionalities described in FIGS. 1-4. In some embodiments, this may include using SDN communications protocol message (e.g., OpenFlow) for such communications.

Figure 6A:
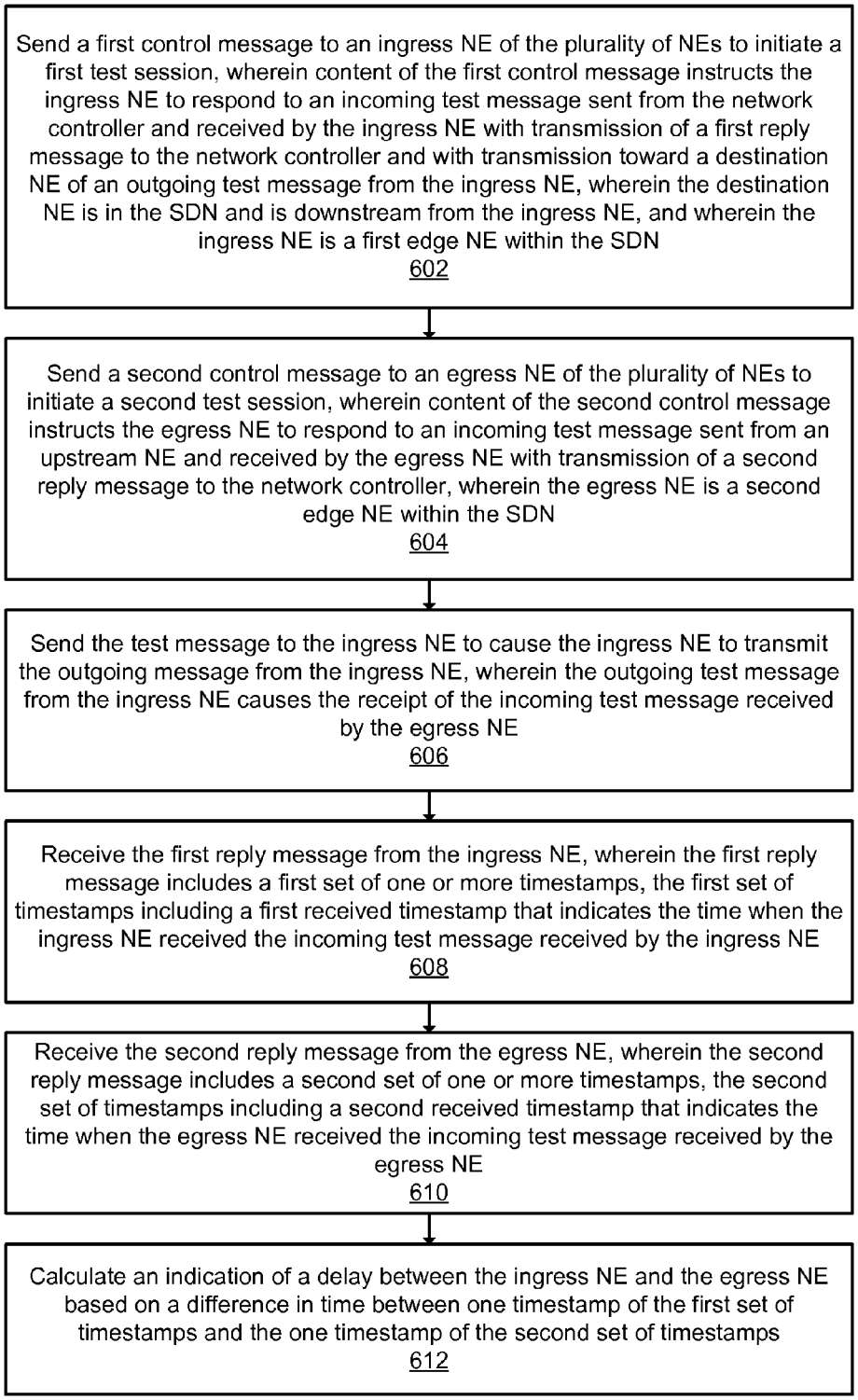
FIG. 6A is a flow diagram illustrating a method 600 for data path performance measurement using test messages in a software defined network according to an embodiment of the invention.

FIG. 6A is a flow diagram illustrating a method 600 for data path performance measurement using test messages in a software defined network according to an embodiment of the invention. For example, method 600 can be performed by the network controller 116. Method 600 may be implemented in software, firmware, hardware, or any combination thereof.

At 602, a network controller sends a first control message to an ingress NE of the plurality of NEs to initiate a first test session, wherein content of the first control message instructs the ingress NE to respond to an incoming test message sent from the network controller and received by the ingress NE with transmission of a first reply message to the network controller and with transmission toward a destination NE of an outgoing test message from the ingress NE, wherein the destination NE is in the SDN and is downstream from the ingress NE, and wherein the ingress NE is a first edge NE within the SDN.

At 604, the network controller sends a second control message to an egress NE of the plurality of NEs to initiate a second test session, wherein content of the second control message instructs the egress NE to respond to an incoming test message sent from an upstream NE and received by the egress NE with transmission of a second reply message to the network controller, wherein the egress NE is a second edge NE within the SDN. In some embodiments, ingress NE is NE 104, and egress NE is NE 112.

In some embodiments, the destination NE is the egress NE. In some embodiments, the first control message further causes the ingress NE to set a destination address indicator of the outgoing test message received by the ingress NE to include a destination address of the destination NE before transmission of the outgoing test message by the ingress NE to the destination NE.

At 606, the network controller sends the test message to the ingress NE to cause the ingress NE to transmit the outgoing message from the ingress NE, wherein the outgoing test message from the ingress NE causes the receipt of the incoming test message received by the egress NE. In some embodiments, the test message to the ingress NE is test message 320.

At 608, the network controller receives the first reply message from the ingress NE, wherein the first reply message includes a first set of one or more timestamps, the first set of timestamps including a first received timestamp that indicates the time when the ingress NE received the incoming test message received by the ingress NE. In some embodiments, the first reply message is reply message 323.

In some embodiments, a sender address indicator of the outgoing test message received by the ingress NE is an address of the network controller, and wherein the first reply message is sent to the network controller based on the address of the network controller in the sender address indicator.

In some embodiments, the first reply message further includes a first sent timestamp that indicates the time when the ingress NE sent the first reply message.

At 610, the network controller receives the second reply message from the egress NE, wherein the second reply message includes a second set of one or more timestamps, the second set of timestamps including a second received timestamp that indicates the time when the egress NE received the incoming test message received by the egress NE. In some embodiments, the second reply message is reply message 338.

At 612, the network controller calculates an indication of a delay between the ingress NE and the egress NE based on a difference in time between one timestamp of the first set of timestamps and one timestamp of the second set of timestamps.

In some embodiments, the test and reply messages are Two-Way Active Measurement Protocol (TWAMP) Test messages and the control messages are TWAMP Control messages.

FIG. 6B is a flow diagram illustrating a method 650 for data path performance measurement using test messages in a software defined network according to an embodiment of the invention. For example, method 650 can be performed by the network controller 116. Method 650 may be implemented in software, firmware, hardware, or any combination thereof.

In one embodiment, the operations of method 650 assume that one or more operations of method 600 have been performed.

At 652, the network controller sends additional control messages to a set of one or more intermediate NEs of the plurality of NEs to initiate test sessions, wherein there is a network path from the ingress NE through the set of intermediate NEs to the egress NE, wherein content of the additional control messages instructs each one of the set of intermediate NEs to respond to receipt of an incoming test message from an upstream NE with transmission of a reply message to the network controller and with transmission along the network path of an outgoing test message from that intermediate NE, wherein the set of intermediate NEs is downstream of the ingress NE and upstream of the egress NE.

In some embodiments, each one of the set of intermediate NEs transmits its outgoing test message to a downstream NE that is along the network path and that is pre-selected by the network controller.

At 654, the network controller, responsive to the sending of the incoming test message to the ingress NE, receives from each of the set of intermediate NEs a reply message that includes one or more timestamps, the one or more timestamps including a received timestamp indicating when that intermediate NE received its incoming test message and a sent timestamp indicating the time that intermediate NE sent the reply message. For example, network controller 116 receives a reply message 124 from NE 106.

At 656, the network controller calculates an indication of a delay between a first of the plurality of NEs and a second of the plurality of NEs based on the difference between one of the one or more timestamps indicated in the reply message of the first NE and one of the one or more timestamps indicated in the reply message of the second NE, wherein the first and second NEs are NEs in a set of the plurality of NEs that have sent reply messages to the network controller.

In some embodiments, the network controller further calculates a jitter indication along the network path by comparing one or more variations in a plurality of indications of delay between the NEs along the network path.

The operations in the flow diagrams have been described with reference to the exemplary embodiments of the other figures. However, it should be understood that the operations of this flow diagram can be performed by embodiments of the invention other than those discussed with reference to the other figures, and the embodiments of the invention discussed with reference to these other figures can perform operations different than those discussed with reference to the flow diagrams.

FIG. 7A illustrates connectivity between network devices (NDs) within an exemplary network, as well as three exemplary implementations of the NDs, according to some embodiments of the invention. FIG. 7A shows NDs 700A-H, and their connectivity by way of a lines between A-B, B-C, C-D, D-E, E-F, F-G, and A-G, as well as between H and each of A, C, D, and G. These NDs are physical devices, and the connectivity between these NDs can be wireless or wired (often referred to as a link). An additional line extending from NDs 700A, E, and F illustrates that these NDs act as ingress and egress points for the network (and thus, these NDs are sometimes referred to as edge NDs; while the other NDs may be called core NDs).

Two of the exemplary ND implementations in FIG. 7A are: 1) a special-purpose network device 702 that uses custom application-specific integrated-circuits (ASICs) and a proprietary operating system (OS); and 2) a general purpose network device 704 that uses common off-the-shelf (COTS) processors and a standard OS.

The special-purpose network device 702 includes networking hardware 710 comprising compute resource(s) 712 (which typically include a set of one or more processors), forwarding resource(s) 714 (which typically include one or more ASICs and/or network processors), and physical network interfaces (NIs) 716 (sometimes called physical ports), as well as non-transitory machine readable storage media 718 having stored therein networking software 720. A physical NI is hardware in a ND through which a network connection (e.g., wirelessly through a wireless network interface controller (WNIC) or through plugging in a cable to a physical port connected to a network interface controller (NIC)) is made, such as those shown by the connectivity between NDs 700A-H. During operation, the networking software 720 may be executed by the networking hardware 710 to instantiate a set of one or more networking software instance(s) 722. Each of the networking software instance(s) 722, and that part of the networking hardware 710 that executes that network software instance (be it hardware dedicated to that networking software instance and/or time slices of hardware temporally shared by that networking software instance with others of the networking software instance(s) 722), form a separate virtual network element 730A-R. Each of the virtual network element(s) (VNEs) 730A-R includes a control communication and configuration module 732A-R (sometimes referred to as a local control module or control communication module) and forwarding table(s) 734A-R, such that a given virtual network element (e.g., 730A) includes the control communication and configuration module (e.g., 732A), a set of one or more forwarding table(s) (e.g., 734A), and that portion of the networking hardware 710 that executes the virtual network element (e.g., 730A).

In some embodiments, each of the virtual network elements 730A-R performs the functionality of a network element as described with reference to FIGS. 1-4. In some embodiments, networking software 720 includes a TVs/AMP module 721 that includes software that when executed by the networking hardware 710 causes each VNE 732A-R to be able to perform the functionality of sending and receiving control, test, and reply messages as described in reference to FIGS. 1-4.

The special-purpose network device 702 is often physically and/or logically considered to include: 1) optionally, a ND control plane 724 (sometimes referred to as a control plane) comprising the compute resource(s) 712 that execute the control communication and configuration module(s) 732A-R; and 2) a ND forwarding plane 726 (sometimes referred to as a forwarding plane, a data plane, or a media plane) comprising the forwarding resource(s) 714 that utilize the forwarding table(s) 734A-R and the physical NIs 716. By way of example, where the ND is a router (or is implementing routing functionality), the ND control plane 724 (the compute resource(s) 712 executing the control communication and configuration module(s) 732A-R) is typically responsible for participating in controlling how data (e.g., packets) is to be routed (e.g., the next hop for the data and the outgoing physical NI for that data) and storing that routing information in the forwarding table(s) 734A-R, and the ND forwarding plane 726 is responsible for receiving that data on the physical NIs 716 and forwarding that data out the appropriate ones of the physical NIs 716 based on the forwarding table(s) 734A-R.

FIG. 7B illustrates an exemplary way to implement the special-purpose network device 702 according to some embodiments of the invention. FIG. 7B shows a special-purpose network device including cards 738 (typically hot pluggable). While in some embodiments the cards 738 are of two types (one or more that operate as the ND forwarding plane 726 (sometimes called line cards), and one or more that operate to implement the ND control plane 724 (sometimes called control cards)), alternative embodiments may combine functionality onto a single card and/or include additional card types (e.g., one additional type of card is called a service card, resource card, or multi-application card). In some embodiments, ND 702 does not include a control card. These cards are coupled together through one or more interconnect mechanisms illustrated as backplane 736 (e.g., a first full mesh coupling the line cards and a second full mesh coupling all of the cards). Returning to FIG. 7A, the general purpose network device 704 includes hardware 740 comprising a set of one or more processor(s) 742 (which are often COTS processors) and network interface controller(s) 744 (NICs; also known as network interface cards) (which include physical NIs 746), as well as non-transitory machine readable storage media 748 having stored therein software 750. During operation, the processor(s) 742 execute the software 750 to instantiate a hypervisor 754 (sometimes referred to as a virtual machine monitor (VMM)) and one or more virtual machines 762A-R that are run by the hypervisor 754, which are collectively referred to as software instance(s) 752. A virtual machine is a software implementation of a physical machine that runs programs as if they were executing on a physical, non-virtualized machine; and applications generally do not know they are running on a virtual machine as opposed to running on a "bare metal" host electronic device, though some systems provide para-virtualization which allows an operating system or application to be aware of the presence of virtualization for optimization purposes. Each of the virtual machines 762A-R, and that part of the hardware 740 that executes that virtual machine (be it hardware dedicated to that virtual machine and/or time slices of hardware temporally shared by that virtual machine with others of the virtual machine(s) 762A-R), forms a separate virtual network element(s) 760A-R.

In some embodiments, a virtual network element 760 performs the functionality of a network element as described with reference to FIGS. 1-4. In some embodiments, networking software 750 includes a TWAMP module 751 that includes software that when executed by the processors 742 causes each virtual network element(s) 760A-R to be able to perform the functionality of sending and receiving control, test, and reply messages as described in reference to FIGS. 1-4.

The virtual network element(s) 760A-R perform similar functionality to the virtual network element(s) 730A-R. For instance, the hypervisor 754 may present a virtual operating platform that appears like networking hardware 710 to virtual machine 762A, and the virtual machine 762A may be used to implement functionality similar to the control communication and configuration module(s) 732A and forwarding table(s) 734A (this virtualization of the hardware 740 is sometimes referred to as network function virtualization (NFV)). Thus, NFV may be used to consolidate many network equipment types onto industry standard high volume server hardware, physical switches, and physical storage, which could be located in Data centers, NDs, and customer premise equipment (CPE). However, different embodiments of the invention may implement one or more of the virtual machine(s) 762A-R differently. For example, while embodiments of the invention are illustrated with each virtual machine 762A-R corresponding to one VNE 760A-R, alternative embodiments may implement this correspondence at a finer level granularity (e.g., line card virtual machines virtualize line cards, control card virtual machine virtualize control cards, etc.); it should be understood that the techniques described herein with reference to a correspondence of virtual machines to VNEs also apply to embodiments where such a finer level of granularity is used.

In certain embodiments, the hypervisor 754 includes a virtual switch that provides similar forwarding services as a physical Ethernet switch. Specifically, this virtual switch forwards traffic between virtual machines and the NIC(s) 744, as well as optionally between the virtual machines 762A-R; in addition, this virtual switch may enforce network isolation between the VNEs 760A-R that by policy are not permitted to communicate with each other (e.g., by honoring virtual local area networks (VLANs)). The third exemplary ND implementation in FIG. 7A is a hybrid network device 706, which includes both custom ASICs/proprietary OS and COTS processors/standard OS in a single ND or a single card within an ND. In certain embodiments of such a hybrid network device, a platform VM (i.e., a VM that implements the functionality of the special-purpose network device 702) could provide for para-virtualization to the networking hardware present in the hybrid network device 706.

Regardless of the above exemplary implementations of an ND, when a single one of multiple VNEs implemented by an ND is being considered (e.g., only one of the VNEs is part of a given virtual network) or where only a single VNE is currently being implemented by an ND, the shortened term network element (NE) is sometimes used to refer to that VNE. Also in all of the above exemplary implementations, each of the VNEs (e.g., VNE(s) 730A-R, VNEs 760A-R, and those in the hybrid network device 706) receives data on the physical NIs (e.g., 716, 746) and forwards that data out the appropriate ones of the physical NIs (e.g., 716, 746). For example, a VNE implementing IP router functionality forwards IP packets on the basis of some of the IP header information in the IP packet; where IP header information includes source IP address, destination IP address, source port, destination port (where "source port" and "destination port" refer herein to protocol ports, as opposed to physical ports of a ND), transport protocol (e.g., user datagram protocol (UDP) (RFC 768, 2460, 2675, 4113, and 5405), Transmission Control Protocol (TCP) (RFC 793 and 1180), and differentiated services (DSCP) values (RFC 2474, 2475, 2597, 2983, 3086, 3140, 3246, 3247, 3260, 4594, 5865, 3289, 3290, and 3317).

Figure 7C:
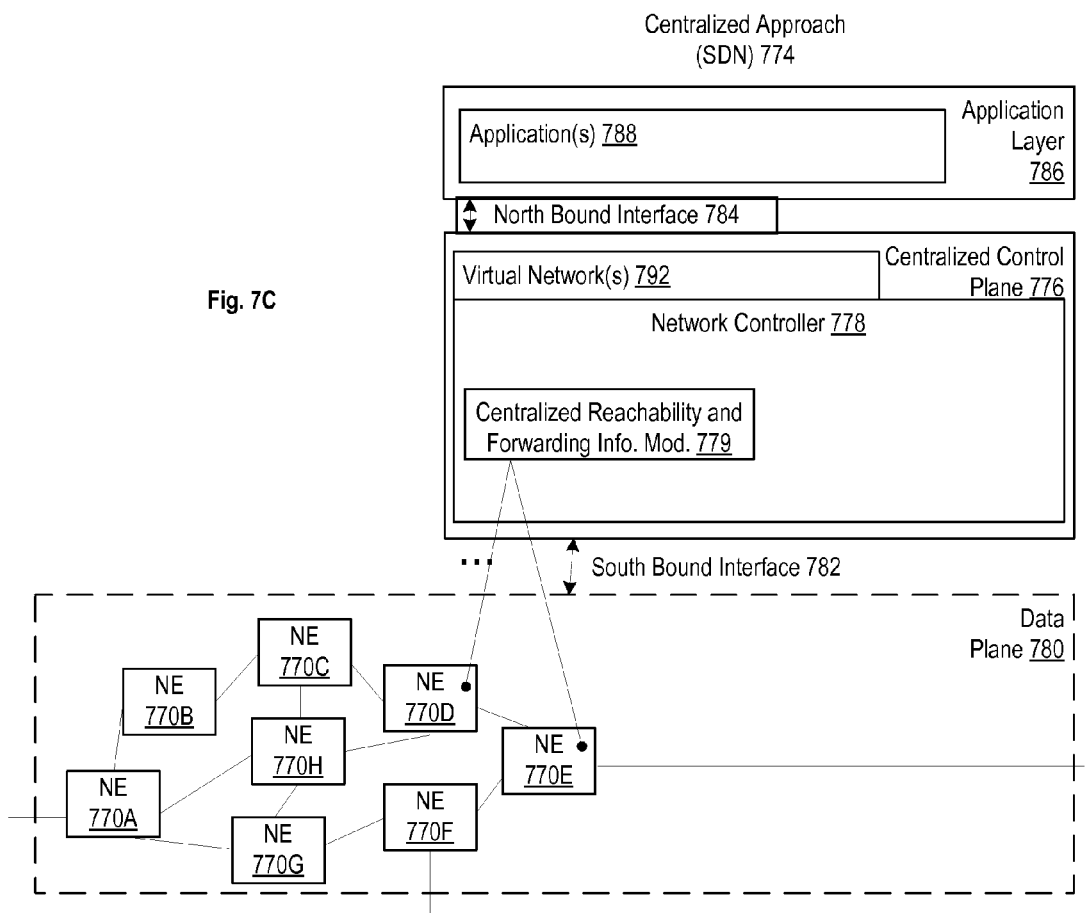
FIG. 7C illustrates a network with a single network element (NE) on each of the NDs of FIG. 7A, and within this straight forward approach contrasts a traditional distributed approach (commonly used by traditional routers) with a centralized approach for maintaining reachability and forwarding information (also called network control), according to some embodiments of the invention.

FIG. 7C illustrates a network with a single network element on each of the NDs of FIG. 7A, and within this straight forward approach contrasts a traditional distributed approach (commonly used by traditional routers) with a centralized approach for maintaining reachability and forwarding information (also called network control), according to some embodiments of the invention. Specifically, FIG. 7C illustrates network elements (NEs) 770A-H with the same connectivity as the NDs 700A-H of FIG. 7A.

FIG. 7C illustrates a centralized approach 774 (also known as software defined networking (SDN)) that decouples the system that makes decisions about where traffic is sent from the underlying systems that forwards traffic to the selected destination. In some embodiments, this centralized approach is used for the SDN as described with reference to FIGS. 1-4. The illustrated centralized approach 774 has the responsibility for the generation of reachability and forwarding information in a centralized control plane 776 (sometimes referred to as a SDN control module, controller, network controller, OpenFlow controller, SDN controller, control plane node, network virtualization authority, or management control entity), and thus the process of neighbor discovery and topology discovery is centralized. The centralized control plane 776 has a south bound interface 782 with a data plane 780 (sometime referred to the infrastructure layer, network forwarding plane, or forwarding plane (which should not be confused with a ND forwarding plane)) that includes the NEs 770A-H (sometimes referred to as switches, forwarding elements, data plane elements, or nodes). The centralized control plane 776 includes a network controller 778, which includes a centralized reachability and forwarding information module 779 that determines the reachability within the network and distributes the forwarding information to the NEs 770A-H of the data plane 780 over the south bound interface 782 (which may use the OpenFlow protocol). Thus, the network intelligence is centralized in the centralized control plane 776 executing on electronic devices that are typically separate from the NDs. In some embodiments, network controller 778 includes the functionality of the network controller 116 as described with reference to FIGS. 1-4.

For example, where the special-purpose network device 702 is used in the data plane 780, each of the control communication and configuration module(s) 732A-R of the ND control plane 724 typically include a control agent that provides the VNE side of the south bound interface 782. In this case, the ND control plane 724 (the compute resource(s) 712 executing the control communication and configuration module(s) 732A-R) performs its responsibility for participating in controlling how data (e.g., packets) is to be routed (e.g., the next hop for the data and the outgoing physical NI for that data) through the control agent communicating with the centralized control plane 776 to receive the forwarding information (and in some cases, the reachability information) from the centralized reachability and forwarding information module 779 (it should be understood that in some embodiments of the invention, the control communication and configuration module(s) 732A-R, in addition to communicating with the centralized control plane 776, may also play some role in determining reachability and/or calculating forwarding information—albeit less so than in the case of a distributed approach; such embodiments are generally considered to fall under the centralized approach 774, but may also be considered a hybrid approach).

While the above example uses the special-purpose network device 702, the same centralized approach 774 can be implemented with the general purpose network device 704 (e.g., each of the VNE 7A60A-R performs its responsibility for controlling how data (e.g., packets) is to be routed (e.g., the next hop for the data and the outgoing physical NI for that data) by communicating with the centralized control plane 776 to receive the forwarding information (and in some cases, the reachability information) from the centralized reachability and forwarding information module 779; it should be understood that in some embodiments of the invention, the VNEs 7A60A-R, in addition to communicating with the centralized control plane 776, may also play some role in determining reachability and/or calculating forwarding information—albeit less so than in the case of a distributed approach) and the hybrid network device 706. In fact, the use of SDN techniques can enhance the NFV techniques typically used in the general purpose network device 704 or hybrid network device 706 implementations as NFV is able to support SDN by providing an infrastructure upon which the SDN software can be run, and NFV and SDN both aim to make use of commodity server hardware and physical switches.

FIG. 7C also shows that the centralized control plane 776 has a north bound interface 784 to an application layer 786, in which resides application(s) 788. The centralized control plane 776 has the ability to form virtual networks 792 (sometimes referred to as a logical forwarding plane, network services, or overlay networks (with the NEs 770A-H of the data plane 780 being the underlay network)) for the application(s) 788. Thus, the centralized control plane 776 maintains a global view of all NDs and configured NEs/VNEs, and it maps the virtual networks to the underlying NDs efficiently (including maintaining these mappings as the physical network changes either through hardware (ND, link, or ND component) failure, addition, or removal).

While FIG. 7C illustrates the simple case where each of the NDs 700A-H implements a single NE 770A-H, it should be understood that the network control approaches described with reference to FIG. 7C also work for networks where one or more of the NDs 700A-H implement multiple VNEs (e.g., VNEs 730A-R, VNEs 760A-R, those in the hybrid network device 706). Alternatively or in addition, the network controller 778 may also emulate the implementation of multiple VNEs in a single ND. Specifically, instead of (or in addition to) implementing multiple VNEs in a single ND, the network controller 778 may present the implementation of a VNE/NE in a single ND as multiple VNEs in the virtual networks 792 (all in the same one of the virtual network(s) 792, each in different ones of the virtual network(s) 792, or some combination). For example, the network controller 778 may cause an ND to implement a single VNE (a NE) in the underlay network, and then logically divide up the resources of that NE within the centralized control plane 776 to present different VNEs in the virtual network(s) 792 (where these different VNEs in the overlay networks are sharing the resources of the single VNE/NE implementation on the ND in the underlay network).

While some embodiments of the invention implement the centralized control plane 776 as a single entity (e.g., a single instance of software running on a single electronic device), alternative embodiments may spread the functionality across multiple entities for redundancy and/or scalability purposes (e.g., multiple instances of software running on different electronic devices).

Figure 8:
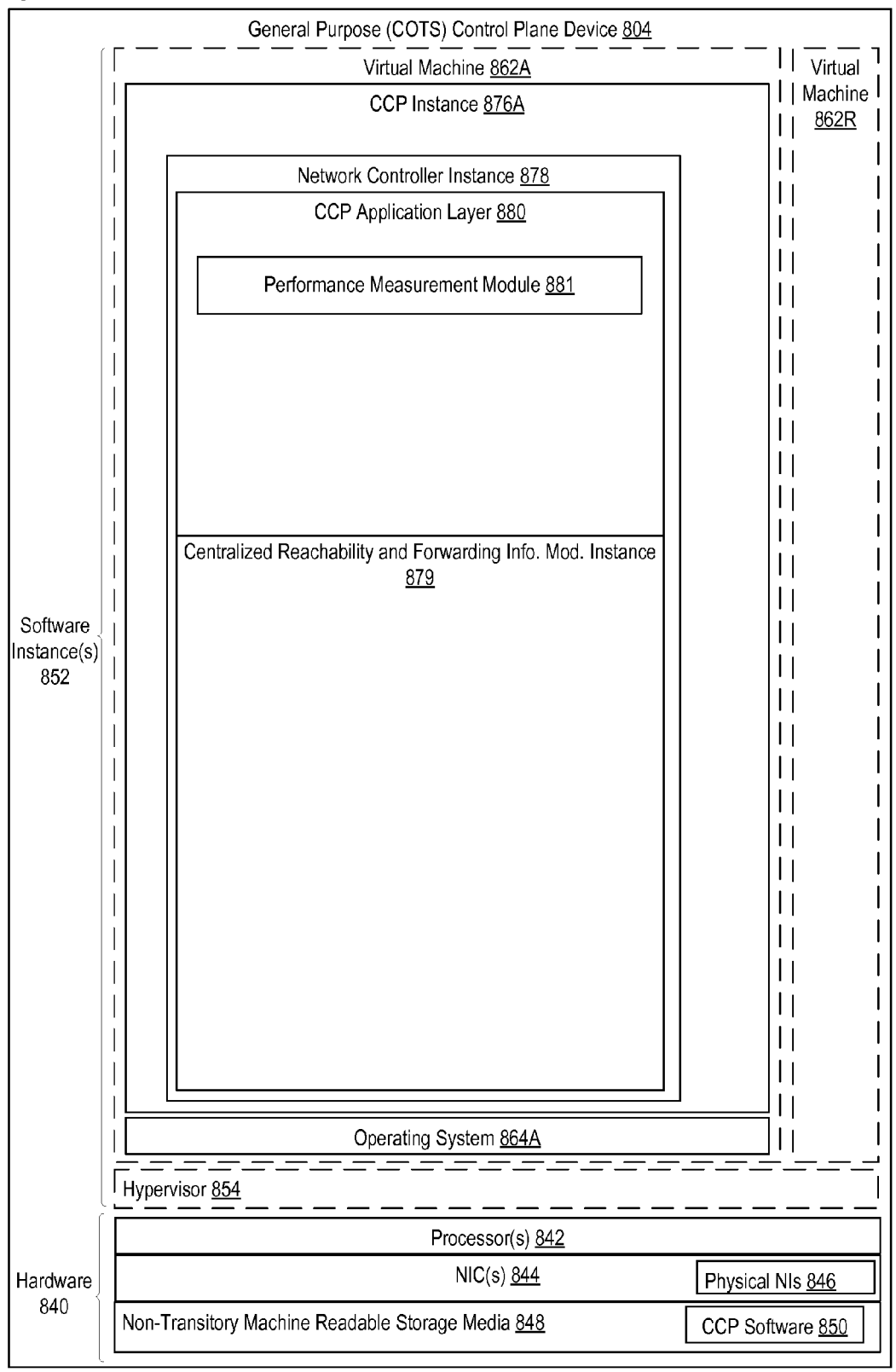
FIG. 8 illustrates a general purpose control plane device 804 including hardware 840 comprising a set of one or more processor(s) 842 (which are often Commercial off-the-shelf (COTS) processors) and network interface controller(s) 844 (NICs; also known as network interface cards) (which include physical NIs 846), as well as non-transitory machine readable storage media 848 having stored therein centralized control plane (CCP) software 850), according to some embodiments of the invention.

Similar to the network device implementations, the electronic device(s) running the centralized control plane 776, and thus the network controller 778 including the centralized reachability and forwarding information module 779, may be implemented a variety of ways (e.g., a special purpose device, a general-purpose (e.g., COTS) device, or hybrid device). These electronic device(s) would similarly include compute resource(s), a set or one or more physical NICs, and a non-transitory machine-readable storage medium having stored thereon the centralized control plane software. For instance, FIG. 8 illustrates, a general purpose control plane device 804 including hardware 840 comprising a set of one or more processor(s) 842 (which are often COTS processors) and network interface controller(s) 844 (NICs; also known as network interface cards) (which include physical NIs 846), as well as non-transitory machine readable storage media 848 having stored therein centralized control plane (CCP) software 850.

In embodiments that use compute virtualization, the processor(s) 842 typically execute software to instantiate a hypervisor 854 (sometimes referred to as a virtual machine monitor (VMM)) and one or more virtual machines 862A-R that are run by the hypervisor 854; which are collectively referred to as software instance(s) 852. A virtual machine is a software implementation of a physical machine that runs programs as if they were executing on a physical, non-virtualized machine; and applications generally are not aware they are running on a virtual machine as opposed to running on a "bare metal" host electronic device, though some systems provide para-virtualization which allows an operating system or application to be aware of the presence of virtualization for optimization purposes. Again, in embodiments where compute virtualization is used, during operation an instance of the CCP software 850 (illustrated as CCP instance 876A) on top of an operating system 864A are typically executed within the virtual machine 862A. In embodiments where compute virtualization is not used, the CCP instance 876A on top of operating system 864A is executed on the "bare metal" general purpose control plane device 804.

The operating system 864A provides basic processing, input/output (I/O), and networking capabilities. In some embodiments, the CCP instance 876A includes a network controller instance 878. The network controller instance 878 includes a centralized reachability and forwarding information module instance 879 (which is a middleware layer providing the context of the network controller 778 to the operating system 864A and communicating with the various NEs), and an CCP application layer 880 (sometimes referred to as an application layer) over the middleware layer (providing the intelligence required for various network operations such as protocols, network situational awareness, and user-interfaces). At a more abstract level, this CCP application layer 880 within the centralized control plane 776 works with virtual network view(s) (logical view(s) of the network) and the middleware layer provides the conversion from the virtual networks to the physical view.

In some embodiments, network controller instance 878 includes the functionality of the network controller 116 as described with reference to FIGS. 1-4.

The centralized control plane 776 transmits relevant messages to the data plane 780 based on CCP application layer 880 calculations and middleware layer mapping for each flow. A flow may be defined as a set of packets whose headers match a given pattern of bits; in this sense, traditional IP forwarding is also flow-based forwarding where the flows defined by the destination IP address for example; however, in other implementations the given pattern of bits used for a flow definition may include more fields (e.g., 10 or more) in the packet headers. Different NDs/NEs/VNEs of the data plane 780 may receive different messages, and thus different forwarding information. The data plane 780 processes these messages and programs the appropriate flow information and corresponding actions in the forwarding tables (sometime referred to as flow tables) of the appropriate NE/VNEs, and then the NEs/VNEs map incoming packets to flows represented in the forwarding tables and forward packets based on the matches in the forwarding tables.

In some embodiments, CCP application layer 880 includes a performance measurement module 881 that includes the functionality of the TWAMP plugin 118 as described with reference to FIGS. 1-4.

Standards such as OpenFlow define the protocols used for the messages, as well as a model for processing the packets. The model for processing packets includes header parsing, packet classification, and making forwarding decisions. Header parsing describes how to interpret a packet based upon a well-known set of protocols. Some protocol fields are used to build a match structure (or key) that will be used in packet classification (e.g., a first key field could be a source media access control (MAC) address, and a second key field could be a destination MAC address).

Packet classification involves executing a lookup in memory to classify the packet by determining which entry (also referred to as a forwarding table entry or flow entry) in the forwarding tables best matches the packet based upon the match structure, or key, of the forwarding table entries. It is possible that many flows represented in the forwarding table entries can correspond/match to a packet; in this case the system is typically configured to determine one forwarding table entry from the many according to a defined scheme (e.g., selecting a first forwarding table entry that is matched). Forwarding table entries include both a specific set of match criteria (a set of values or wildcards, or an indication of what portions of a packet should be compared to a particular value/values/wildcards, as defined by the matching capabilities—for specific fields in the packet header, or for some other packet content), and a set of one or more actions for the data plane to take on receiving a matching packet. For example, an action may be to push a header onto the packet, for the packet using a particular port, flood the packet, or simply drop the packet. Thus, a forwarding table entry for IPv4/IPv6 packets with a particular transmission control protocol (TCP) destination port could contain an action specifying that these packets should be dropped.

Making forwarding decisions and performing actions occurs, based upon the forwarding table entry identified during packet classification, by executing the set of actions identified in the matched forwarding table entry on the packet.

However, when an unknown packet (for example, a "missed packet" or a "match-miss" as used in OpenFlow parlance) arrives at the data plane 780, the packet (or a subset of the packet header and content) is typically forwarded to the centralized control plane 776. The centralized control plane 776 will then program forwarding table entries into the data plane 780 to accommodate packets belonging to the flow of the unknown packet. Once a specific forwarding table entry has been programmed into the data plane 780 by the centralized control plane 776, the next packet with matching credentials will match that forwarding table entry and take the set of actions associated with that matched entry.

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method in a network controller of a control plane in a software defined network (SDN) coupled to a plurality of network elements (NEs) of a data plane in the SDN, comprising:

sending a first control message to an ingress NE of the plurality of NEs to initiate a first test session, wherein content of the first control message instructs the ingress NE to respond to an incoming test message sent from the network controller and received by the ingress NE with transmission of a first reply message to the network controller and with transmission toward a destination NE of an outgoing test message from the ingress NE, wherein the destination NE is in the SDN and is downstream from the ingress NE, and wherein the ingress NE is a first edge NE within the SDN;

sending a second control message to an egress NE of the plurality of NEs to initiate a second test session, wherein content of the second control message instructs the egress NE to respond to an incoming test message sent from an upstream NE and received by the egress NE with transmission of a second reply message to the network controller, wherein the egress NE is a second edge NE within the SDN;

sending the test message to the ingress NE to cause the ingress NE to transmit the outgoing test message from the ingress NE, wherein the outgoing test message from the ingress NE causes the receipt of the incoming test message received by the egress NE;

receiving the first reply message from the ingress NE, wherein the first reply message includes a first set of one or more timestamps, the first set of timestamps including a first received timestamp that indicates the time when the ingress NE received the incoming test message received by the ingress NE;

receiving the second reply message from the egress NE, wherein the second reply message includes a second set of one or more timestamps, the second set of timestamps including a second received timestamp that indicates the time when the egress NE received the incoming test message received by the egress NE;

calculating an indication of a delay between the ingress NE and the egress NE based on a difference in time between one timestamp of the first set of timestamps and one timestamp of the second set of timestamps; and rerouting network traffic between the ingress NE and the egress NE in response to a determination that the indication of the delay between the ingress NE and the egress NE exceeds a threshold value.

2. The method of claim 1, wherein the first reply message further includes a first sent timestamp that indicates the time when the ingress NE sent the first reply message, and further comprising:

sending additional control messages to a set of one or more intermediate NEs of the plurality of NEs to initiate test sessions, wherein there is a network path from the ingress NE through the set of intermediate NEs to the egress NE, wherein content of the additional control messages instructs each one of the set of intermediate NEs to respond to receipt of an incoming test message from an upstream NE with transmission of a reply message to the network controller and with transmission along the network path of an outgoing test message from that intermediate NE, wherein the set of intermediate NEs is downstream of the ingress NE and upstream of the egress NE;

responsive to sending the incoming test message to the ingress NE, receiving from each of the set of intermediate NEs a reply message that includes one or more timestamps, the one or more timestamps including a received timestamp indicating when that intermediate NE received its incoming test message and a sent timestamp indicating the time that intermediate NE sent the reply message; and calculating an indication of a delay between a first of the plurality of NEs and a second of the plurality of NEs based on the difference between one of the one or more timestamps indicated in the reply message of the first NE and one of the one or more timestamps indicated in the reply message of the second NE, wherein the first and second NEs are NEs in a set of the plurality of NEs that have sent reply messages to the network controller.

3. The method of claim 2, wherein each one of the set of intermediate NEs transmits its outgoing test message to a downstream NE that is along the network path and that is pre-selected by the network controller.

4. The method of claim 2, wherein the network controller further calculates a jitter indication along the network path by comparing one or more variations in a plurality of indications of delay between the NEs along the network path.

5. The method of claim 1, wherein the destination NE is the egress NE.

6. The method of claim 1, wherein the first control message further causes the ingress NE to set a destination address indicator of the outgoing test message received by the ingress NE to include a destination address of the destination NE before transmission of the outgoing test message by the ingress NE to the destination NE.

7. The method of claim 1, wherein a sender address indicator of the outgoing test message received by the ingress NE is an address of the network controller, and wherein the first reply message is sent to the network controller based on the address of the network controller in the sender address indicator.

8. The method of claim 1, wherein the test and reply messages are Two-Way Active Measurement Protocol (TWAMP) Test messages and the control messages are TWAMP Control messages.

9. A network controller of a control plane in a software defined network (SDN) coupled to a plurality of network elements (NEs) of a data plane in the SDN, comprising:

a processor and a memory, said memory containing instructions executable by the processor whereby the network controller is operative to:

send a first control message to an ingress NE of the plurality of NEs to initiate a first test session, wherein content of the first control message instructs the ingress NE to respond to an incoming test message sent from the network controller and received by the ingress NE with transmission of a first reply message to the network controller and with transmission toward a destination NE of an outgoing test message from the ingress NE, wherein the destination NE is in the SDN and is downstream from the ingress NE, and wherein the ingress NE is a first edge NE within the SDN;

send a second control message to an egress NE of the plurality of NEs to initiate a second test session, wherein content of the second control message instructs the egress NE to respond to an incoming test message sent from an upstream NE and received by the egress NE with transmission of a second reply message to the network controller, wherein the egress NE is a second edge NE within the SDN;

send the test message to the ingress NE to cause the ingress NE to transmit the outgoing test message from the ingress NE, wherein the outgoing test message from the ingress NE causes the receipt of the incoming test message received by the egress NE;

receive the first reply message from the ingress NE, wherein the first reply message includes a first set of one or more timestamps, the first set of timestamps including a first received timestamp that indicates the time when the ingress NE received the incoming test message received by the ingress NE;

receive the second reply message from the egress NE, wherein the second reply message includes a second set of one or more timestamps, the second set of timestamps including a second received timestamp that indicates the time when the egress NE received the incoming test message received by the egress NE;

calculate an indication of a delay between the ingress NE and the egress NE based on a difference in time between one timestamp of the first set of timestamps and the one timestamp of the second set of timestamps; and reroute network traffic between the ingress NE and the egress NE in response to a determination that the indication of the delay between the ingress NE and the egress NE exceeds a threshold value.

10. The network controller of claim 9, wherein the first reply message further includes a first sent timestamp that indicates the time when the ingress NE sent the first reply message, and whereby the network controller is further operative to:

send additional control messages to a set of one or more intermediate NEs of the plurality of NEs to initiate test sessions, wherein there is a network path from the ingress NE through the set of intermediate NEs to the egress NE, wherein content of the additional control messages instructs each one of the set of intermediate NEs to respond to receipt of an incoming test message from an upstream NE with transmission of a reply message to the network controller and with transmission along the network path of an outgoing test message from that intermediate NE, wherein the set of intermediate NEs is downstream of the ingress NE and upstream of the egress NE;

responsive to the sending of the incoming test message to the ingress NE, receive a from each of the set of intermediate NEs a reply message that includes one or more timestamps, the one or more timestamps including a received timestamp indicating when that intermediate NE received its incoming test message and a sent timestamp indicating the time that intermediate NE sent the reply message; and calculate an indication of a delay between a first of the plurality of NEs and a second of the plurality of NEs based on the difference between one of the one or more timestamps indicated in the reply message of the first NE and one of the one or more timestamps indicated in the reply message of the second NE, wherein the first and second NEs are NEs in a set of the plurality of NEs that have sent reply messages to the network controller.

11. The network controller of claim 10, wherein each one of the set of intermediate NEs transmits its outgoing test message to a downstream NE that is along the network path and that is pre-selected by the network controller.

12. The network controller of claim 10, wherein the network controller further calculates a jitter indication along the network path by comparing one or more variations in a plurality of indications of delay between the NEs along the network path.

13. The network controller of claim 9, wherein the destination NE is the egress NE.

14. The network controller of claim 9, wherein the first control message further causes the ingress NE to set a destination address indicator of the outgoing test message received by the ingress NE to include a destination address of the destination NE before transmission of the outgoing test message by the ingress NE to the destination NE.

15. The network controller of claim 9, wherein a sender address indicator of the outgoing test message received by the ingress NE is an address of the network controller, and wherein the first reply message is sent to the network controller based on the address of the network controller in the sender address indicator.

16. The network controller of claim 9, wherein the test and reply messages are Two-Way Active Measurement Protocol (TWAMP) Test messages and the control messages are TWAMP Control messages.

17. A non-transitory computer-readable storage medium having instructions stored therein, wherein the instructions, when executed by a processor of a network controller of a control plane in a software defined network (SDN) coupled to a plurality of network elements (NEs) of a data plane in the SDN, cause the processor to perform operations comprising:
sending a first control message to an ingress NE of the plurality of NEs to initiate a first test session, wherein content of the first control message instructs the ingress NE to respond to an incoming test message sent from the network controller and received by the ingress NE with transmission of a first reply message to the network controller and with transmission toward a destination NE of an outgoing test message from the ingress NE, wherein the destination NE is in the SDN and is downstream from the ingress NE, and wherein the ingress NE is a first edge NE within the SDN;
sending a second control message to an egress NE of the plurality of NEs to initiate a second test session, wherein content of the second control message instructs the egress NE to respond to an incoming test message sent from an upstream NE and received by the egress NE with transmission of a second reply message to the network controller, wherein the egress NE is a second edge NE within the SDN;
sending the test message to the ingress NE to cause the ingress NE to transmit the outgoing test message from the ingress NE, wherein the outgoing test message from the ingress NE causes the receipt of the incoming test message received by the egress NE;
receiving the first reply message from the ingress NE, wherein the first reply message includes a first set of one or more timestamps, the first set of timestamps including a first received timestamp that indicates the time when the ingress NE received the incoming test message received by the ingress NE;
receiving the second reply message from the egress NE, wherein the second reply message includes a second set of one or more timestamps, the second set of timestamps including a second received timestamp that indicates the time when the egress NE received the incoming test message received by the egress NE;
calculating an indication of a delay between the ingress NE and the egress NE based on a difference in time between one timestamp of the first set of timestamps and one timestamp of the second set of timestamps; and
rerouting network traffic between the ingress NE and the egress NE in response to a determination that the indication of the delay between the ingress NE and the egress NE exceeds a threshold value.

18. The non-transitory computer-readable storage medium of claim 17, wherein the first reply message further includes a first sent timestamp that indicates the time when the ingress NE sent the first reply message, the operations further comprising:
sending additional control messages to a set of one or more intermediate NEs of the plurality of NEs to initiate test sessions, wherein there is a network path from the ingress NE through the set of intermediate NEs to the egress NE, wherein content of the additional control messages instructs each one of the set of intermediate NEs to respond to receipt of an incoming test message from an upstream NE with transmission of a reply message to the network controller and with transmission along the network path of an outgoing test message from that intermediate NE, wherein the set of intermediate NEs is downstream of the ingress NE and upstream of the egress NE;
responsive to sending the incoming test message to the ingress NE, receiving a from each of the set of intermediate NEs a reply message that includes one or more timestamps, the one or more timestamps including a received timestamp indicating when that intermediate NE received its incoming test message and a sent timestamp indicating the time that intermediate NE sent the reply message; and
calculating an indication of a delay between a first of the plurality of NEs and a second of the plurality of NEs based on the difference between one of the one or more timestamps indicated in the reply message of the first NE and one of the one or more timestamps indicated in the reply message of the second NE, wherein the first and second NEs are NEs in a set of the plurality of NEs that have sent reply messages to the network controller.

19. The non-transitory computer-readable storage medium of claim 18, wherein each one of the set of intermediate NEs transmits its outgoing test message to a downstream NE that is along the network path and that is pre-selected by the network controller.

20. The non-transitory computer-readable storage medium of claim 18, wherein the network controller further calculates a jitter indication along the network path by comparing one or more variations in a plurality of indications of delay between the NEs along the network path.

21. The non-transitory computer-readable storage medium of claim 17, wherein the destination NE is the egress NE.

22. The non-transitory computer-readable storage medium of claim 17, wherein the first control message further causes the ingress NE to set a destination address indicator of the outgoing test message received by the ingress NE to include a destination address of the destination NE before transmission of the outgoing test message by the ingress NE to the destination NE.

23. The non-transitory computer-readable storage medium of claim 17, wherein a sender address indicator of the outgoing test message received by the ingress NE is an address of the network controller, and wherein the first reply message is sent to the network controller based on the address of the network controller in the sender address indicator.

24. The non-transitory computer-readable storage medium of claim 17, wherein the test and reply messages are Two-Way Active Measurement Protocol (TWAMP) Test messages and the control messages are TWAMP Control messages.

* * * * *